(12) United States Patent
Evans et al.

(10) Patent No.: US 12,645,347 B1
(45) Date of Patent: Jun. 2, 2026

(54) SCALABLE USER INTERFACE DEFECT DETECTION IN MEDIA PLAYER APPLICATIONS VIA ANALYSIS OF PAGE STRUCTURE

(71) Applicant: Amazon Technologies, Inc., Seattle, WA (US)

(72) Inventors: Noel Evans, Reading (GB); Mayur Shyamsunder Rao, London (GB); Vijay Jagdish Joshi, London (GB); Sam Fallahi, London (GB); Joshua Henry Melrose, Cambridge (GB); James Christy, Ipswich (GB); Muhammad Raffay Hamid, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 305 days.

(21) Appl. No.: 17/683,193

(22) Filed: Feb. 28, 2022

(51) Int. Cl.
| | |
|---|---|
| *G06F 3/0484* | (2022.01) |
| *G06F 3/0481* | (2022.01) |
| *G06F 11/3668* | (2025.01) |
| *G06T 7/00* | (2017.01) |
| *G06T 7/194* | (2017.01) |

(Continued)

(52) U.S. Cl.
CPC .......... *G06F 3/0484* (2013.01); *G06F 3/0481* (2013.01); *G06F 11/3668* (2013.01); *G06T 7/0002* (2013.01); *G06T 7/194* (2017.01); *G06V 20/50* (2022.01); *G06V 20/70* (2022.01)

(58) Field of Classification Search
CPC ......... G06F 3/048; G06F 3/0481–0483; G06F 3/0484–0486; G06F 9/451–454; G06F 11/36–36961; G06F 11/3668; G06T 7/0002–0016; G06T 7/10–194; G06V 20/70; G06V 20/50–597
See application file for complete search history.

(56) References Cited

U.S. PATENT DOCUMENTS

| | | | |
|---|---|---|---|
| 11,227,096 B2 * | 1/2022 | Ren | ...................... G06T 11/001 |
| 2011/0173552 A1 * | 7/2011 | Ikegami | .............. G06F 11/3692 |
| | | | 715/765 |

(Continued)

OTHER PUBLICATIONS

Yang, Cheng-Zen, et al. "LAD: A Layout Anomaly Detector for Android Applications." SEKE. 2019. (Year: 2019).*

(Continued)

*Primary Examiner* — Liang Y Li
(74) *Attorney, Agent, or Firm* — NICHOLSON DE VOS WEBSTER & ELLIOTT LLP

(57) ABSTRACT

Techniques for user interface defect detection in media player applications are described. According to some embodiments, a computer-implemented method includes receiving a request at a cloud provider network to perform a defect detection on a media player application, capturing an image of a user interaction with a user interface of the media player application, determining, by the cloud provider network, one or more components of the user interface from pixels of the image, detecting, by the cloud provider network, a defect in the user interface from the one or more components without creating a reference image, and generating, by the cloud provider network, an output based at least in part on the defect.

17 Claims, 18 Drawing Sheets
(4 of 18 Drawing Sheet(s) Filed in Color)

(51) Int. Cl.
   *G06V 20/50*       (2022.01)
   *G06V 20/70*       (2022.01)

(56)            References Cited

U.S. PATENT DOCUMENTS

| | | | | |
|---|---|---|---|---|
| 2013/0287305 A1* | 10/2013 | Dhanda | ........... | G06F 16/958 |
| | | | | 382/218 |
| 2017/0109263 A1* | 4/2017 | Anand | ........... | G06F 8/00 |
| 2018/0174330 A1* | 6/2018 | Chen | ........... | G06T 11/60 |
| 2019/0259144 A1* | 8/2019 | Pathapati | ........... | G06T 7/0002 |
| 2020/0159647 A1* | 5/2020 | Puszkiewicz | ........... | G06F 11/3612 |
| 2022/0261336 A1* | 8/2022 | Luzon | ........... | G06F 11/3698 |

OTHER PUBLICATIONS

Xie, Mulong, et al. "UIED: a hybrid tool for GUI element detection." Proceedings of the 28th ACM Joint Meeting on European Software Engineering Conference and Symposium on the Foundations of Software Engineering. 2020. (Year: 2020).*

Su, Yuhui, et al. "OwlEyes-online: a fully automated platform for detecting and localizing UI display issues." Proceedings of the 29th ACM Joint Meeting on European Software Engineering Conference and Symposium on the Foundations of Software Engineering. 2021. (Year: 2021).*

Liu, Zhe, et al. "Owl eyes: Spotting ui display issues via visual understanding." Proceedings of the 35th IEEE/ACM International Conference on Automated Software Engineering. 2020. (Year: 2020).*

Liu, Zhe, et al. "Nighthawk: Fully automated localizing UI display issues via visual understanding." IEEE Transactions on Software Engineering 49.1. Feb. 14, 2022: 403-418. (Year: 2022).*

Wang, Yaohui, et al. "Textout: Detecting text-layout bugs in mobile apps via visualization-oriented learning." 2019 IEEE 30th International Symposium on Software Reliability Engineering (ISSRE). IEEE, 2019. (Year: 2019).*

* cited by examiner

600

```
┌─────────────────────────────┐
│    RECEIVING A CAPTURED      │
│ APPLICATION IMAGE (CAI) 602  │
└─────────────────────────────┘
                │
                ▼
          ╱─────────────╲                    ┌──────────────────────────┐
         ╱ IS PLAYBACK    ╲      YES          │ EXTRACT BY ALPHA CHANNEL │
        ╱   MODE SELECTED?  ╲────────────────▶│          606             │
         ╲      604         ╱                 └──────────────────────────┘
          ╲───────────────╱
                │ NO
                ▼
┌─────────────────────────────┐
│   IDENTIFY THE PRIMARY       │
│   BACKGROUND COLOR           │
│         608                  │
└─────────────────────────────┘
                │
                ▼
┌─────────────────────────────┐
│  IDENTIFY WHETHER A GRADIENT │
│  BACKGROUND IS PRESENT       │
│          610                 │
└─────────────────────────────┘
                │
                ▼
          ╱─────────────╲                    ┌──────────────────────────┐
         ╱      IS         ╲     YES          │ REMOVE THE BACKGROUND    │
        ╱ GRADIENT BACKGROUND╲───────────────▶│ GRADIENT                 │
        ╲   PRESENT?        ╱                 │          614             │
         ╲      612        ╱                  └──────────────────────────┘
          ╲───────────────╱                               │
                │ NO                                       ▼
                │                            ┌──────────────────────────┐
                │                            │ EXTRACT BY PRIMARY        │
                └───────────────────────────▶│ BACKGROUND COLOR          │
                                             │          616             │
                                             └──────────────────────────┘
```

*FIG. 6*

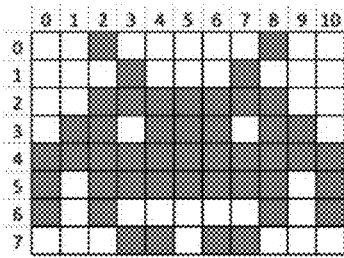
Edge Values
TOP = [4, 3, 0, 1, 2, 2, 2, 1, 0, 3, 4]
BOTTOM = [6, 4, 6, 7, 7, 5, 7, 7, 6, 4, 6]
LEFT = [2, 3, 2, 1, 0, 0, 0, 3]
RIGHT = [8, 7, 8, 9, 10, 10, 10, 7]
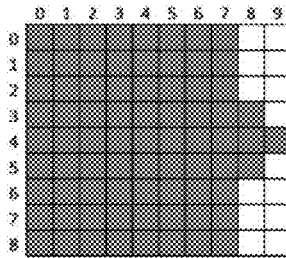
Edge Values
TOP = [0, 0, 0, 0, 0, 0, 0, 0, 3, 4]
BOTTOM = [8, 8, 8, 8, 8, 8, 8, 8, 5, 4]
LEFT = [0, 0, 0, 0, 0, 0, 0, 0, 0]
RIGHT = [7, 7, 7, 8, 9, 8, 7, 7, 7]
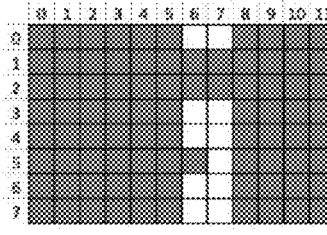
Edge Values
TOP = [0, 0, 0, 0, 0, 0, 1, 1, 0, 0, 0, 0]
BOTTOM = [7, 7, 7, 7, 7, 7, 8, 2, 7, 7, 7, 7]
LEFT = [0, 0, 0, 0, 0, 0, 0, 0]
RIGHT = [11, 11, 11, 11, 11, 11, 11, 11]
*FIG. 7*

1300

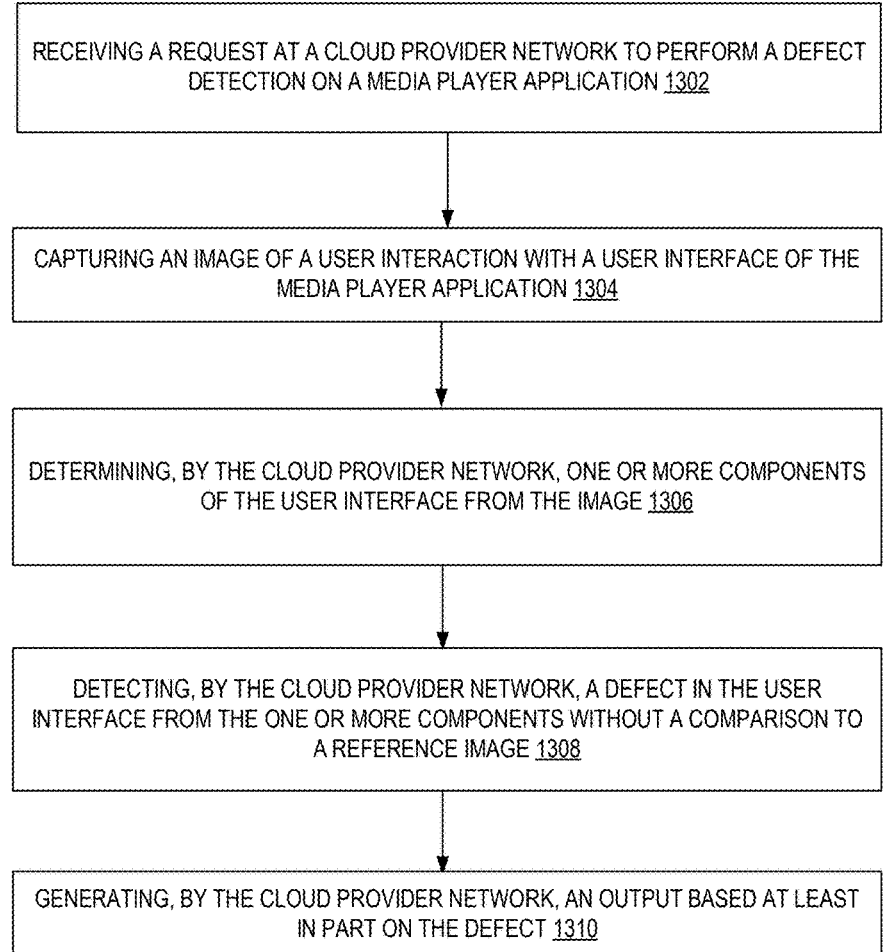

RECEIVING A REQUEST AT A CLOUD PROVIDER NETWORK TO PERFORM A DEFECT DETECTION ON A MEDIA PLAYER APPLICATION 1302

CAPTURING AN IMAGE OF A USER INTERACTION WITH A USER INTERFACE OF THE MEDIA PLAYER APPLICATION 1304

DETERMINING, BY THE CLOUD PROVIDER NETWORK, ONE OR MORE COMPONENTS OF THE USER INTERFACE FROM THE IMAGE 1306

DETECTING, BY THE CLOUD PROVIDER NETWORK, A DEFECT IN THE USER INTERFACE FROM THE ONE OR MORE COMPONENTS WITHOUT A COMPARISON TO A REFERENCE IMAGE 1308

GENERATING, BY THE CLOUD PROVIDER NETWORK, AN OUTPUT BASED AT LEAST IN PART ON THE DEFECT 1310

*FIG. 13*

SCALABLE USER INTERFACE DEFECT DETECTION IN MEDIA PLAYER APPLICATIONS VIA ANALYSIS OF PAGE STRUCTURE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various embodiments in accordance with the present disclosure will be described with reference to the following drawings.

FIG. 6 is a flow diagram illustrating operations of a method for determining components from a captured application image according to some embodiments.

FIG. 7 are example matrices for edge evaluation of a captured application image according to some embodiments.

FIG. 13 is a flow diagram illustrating operations of a method of defect detection on a media player application by a cloud provider network according to some embodiments.

DETAILED DESCRIPTION

Figure 1:
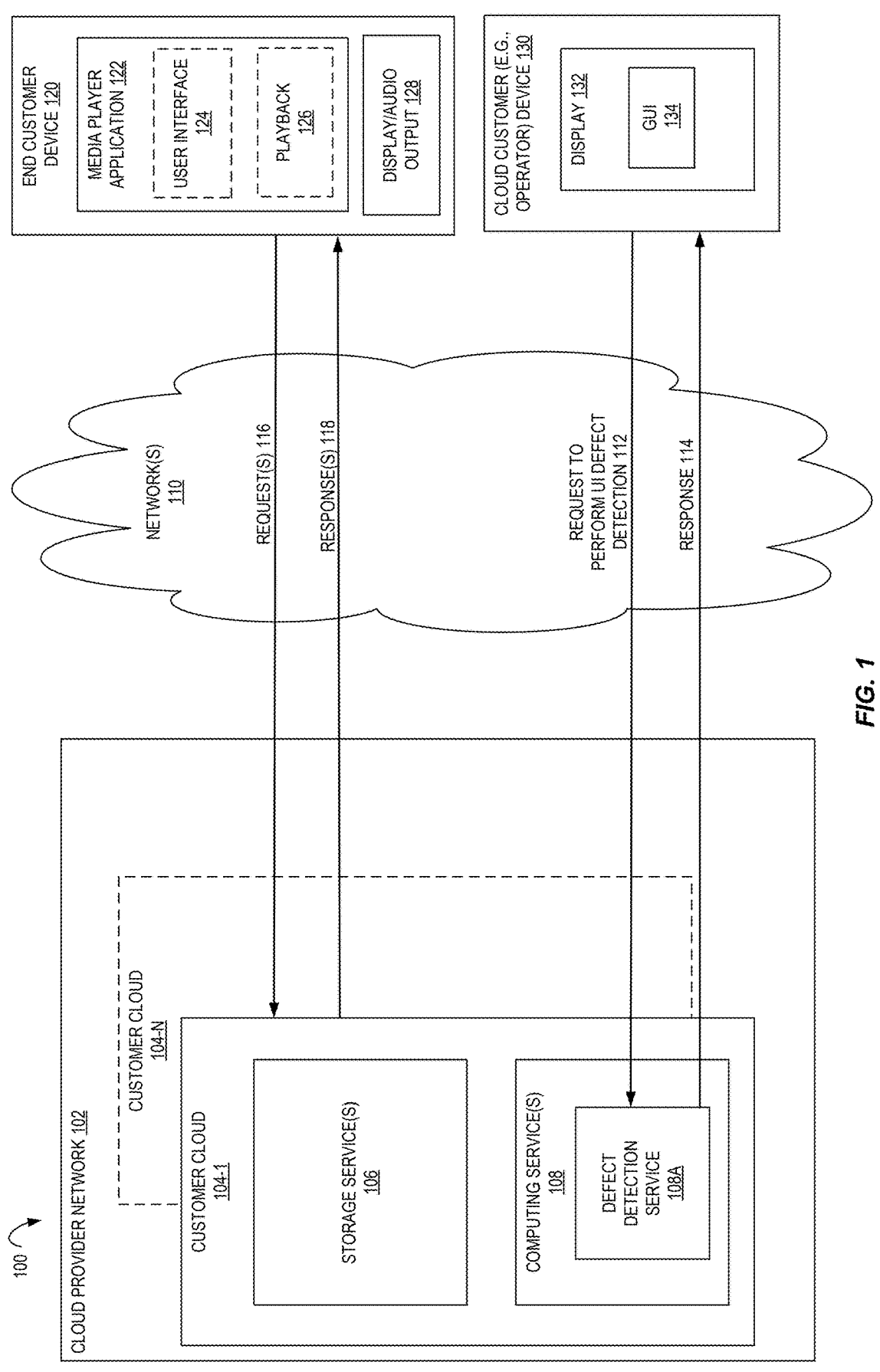
FIG. 1 is a diagram illustrating an environment including a cloud provider network having a defect detection service according to some embodiments.

The present disclosure relates to methods, apparatus, systems, and non-transitory computer-readable storage media for defect detection in a user interface of a media player application. Certain embodiments herein are directed to a computer-implemented service that detects visual defects in a user interface of a media player. Certain embodiments herein are directed to a computer-implemented service that detects visual defects, in a user interface of a media player, outside of a playback experience, for example, defects when interacting with login, browse, search, purchase, and settings pages, etc. In certain embodiments, the media player (e.g., video and/or audio streaming applications) is for an end customer device, for example, a living room device, e.g., a smart television, game console, set-top box, etc. Example visual defects include missing or incorrectly-positioned and/or colliding display components (for example, due to "z-ordering" defects, e.g., where when two or more components overlap, their z-order determines which one appears on top of the other(s)), or an absence of text (for example, due to misconfigured font libraries, e.g., due to a failure to load the specified font). A manual review for defects by a human is ineffective and takes additional time, e.g., time which delays releasing a candidate media player application. With the increasing amount of different living room devices, such a manual review is increasingly more time consuming and cannot practically be performed in the human mind. Embodiments herein are directed to a defect detection service of a cloud provider network that detects a defect in a user interface of a media player application and cannot practically be performed in the human mind.

One example of detecting such defects is by capturing an image (e.g., screenshot) of the user interface (e.g., each page of multiple pages thereof) of the media player application and detecting differences against a corresponding (e.g., "expected") reference image. Such an approach is non-scalable because the reference images must be created and maintained across changes simultaneously occurring in several dimensions, for example, for minor application changes (e.g., including style and layout adjustments, tweaked headings and menus, etc.), changes in the backend catalog (for example, new media (e.g., movies, multiple season series (e.g., with multiple episodes in each season), etc.) that have their title and/or an image for that media appear in the screenshots), a change in a combination of features of the media player (e.g., which are independently enabled by a cloud customer), changes for support for an ever-expanding set of regions, languages, and/or locales, and/or support for an ever-expanding set of reference devices (e.g., with particular rendering quirks and/or resolutions). Because of these factors, user interface (UI) defect tests may be performed only on a tiny fraction of the possible space, and still with a high cost of maintenance without being scalable.

Embodiments herein provide a scalable computer-implemented service that detects visual defects in a user interface of a media player without creating a reference image and/or without a (e.g., pixel by pixel) comparison to the reference image. In certain embodiments, a defect detection service extracts the semantic structure of user interface image(s) (e.g., of pages outside of a playback experience) (e.g., image(s) captured by a human interaction emulation service) and determines one or more defects from those user interface image(s). In certain embodiments, the defect detection service runs the image(s) through a flexible rules system to detect any defects, for example, operating without the need for reference images (e.g., for the page(s) being checked) to be created or maintained. Additionally or alternatively, in certain embodiments, the defect detection service runs the image(s) through a machine learning model trained to detect defect(s), for example, operating without the need for reference images (e.g., for the page(s) being checked) to be created or maintained.

In certain embodiments, extracting the semantic structure from an image of a user interaction with a user interface of a media player application starts with distinguishing between background and foreground content. In certain embodiments, the defect detection service identifies backgrounds, e.g., those with a solid color, gradient fill, and/or use some predefined background image which is provided to the service. In certain embodiments, after isolating the background content, the defect detection service identifies each foreground component (see, e.g., FIG. 10) by grouping together adjacent foreground pixels, for example, and for each component, the location, size, and/or constituent pixels are recorded.

In certain embodiments, the components are then passed through a set of one or more rules and/or a machine learning model to determine whether they signify a user interface defect. In certain embodiments, a set of rules includes: (i) a selection of axiomatic rules that provide baseline guarantees of correct layout across all pages, (ii) each component is strictly rectangular with clean edges (e.g., such that this rule is breached by two forms of layout issues: colliding components and localized component (e.g., button) labels spilling out from the containing component (e.g., button)), (iii) no component spans more than a certain percentage of the entire user interface page width and/or height, (iv) one or more components are present in a key region(s) of the page (e.g., in the top left region of the user interface), and/or (v) no component is a solid block of color (e.g., indicating that a component (e.g., button) label has not rendered). In certain embodiments, one or more rules are enabled and/or disabled according to the source application and page type (e.g., home page, detail page, search page, etc.). In certain embodiments, rules require (e.g., approximate) component placements which are defined in terms of page percentages (e.g., no change is required for a same page rendered in different resolutions, e.g., rendered in high definition (HD) and rendered in 4K resolution). In certain embodiments, as well as detecting defects, rules can also be used to suppress defects detected by other rules (e.g., to support known page oddities, such as, but not limited to, an irregularly shaped component (e.g., button) at a certain location on certain page(s)). In certain embodiments, a machine learning model is used to detect anomalies in the components (e.g., component specifications) for each page, e.g., replacing the rules system.

In certain embodiments, the defect detection service generates an output in response to a particular defect, for example, an output of the image (e.g., screenshot) with a corresponding visual indication, e.g., (e.g., red) highlights around and/or on the offending components.

In certain embodiments, a defect detection service utilizes a human interaction emulation service, e.g., to generate the user interaction with the user interface without a human performing the user interaction. In certain embodiments, the human interaction emulation service emulates human interactions on an end customer device that is executing the media player application. In certain embodiments, the media player application (e.g., software version), device, and configuration (e.g., settings) of the media player application are defined by input arguments to the human interaction emulation service.

Embodiments herein of a defect detection service allow for (e.g., pre-production) media player application versions to be used to check for defects as part of a deployment pipeline. Embodiments herein of a defect detection service include a connection to a set of one or more physical end customer devices, e.g., used in any region supported by the defect detection service. Embodiments herein of a human interaction emulation service allow for the overriding of the application language and/or feature enablement statuses, e.g., to test additional language(s) and feature(s). Embodiments herein of a defect detection service include a connection to a set of one or more virtual end customer devices, e.g., removing the maximum limit on the number of parallel human interaction emulation service agents running. Embodiments herein of a defect detection service capture an application image (e.g., screenshot) after an (e.g., every) interaction. In certain embodiments, a human interaction emulation service is to capture an application image (e.g., screenshot) after an (e.g., every) interaction by the human interaction emulation service, e.g., and send that image to the defect detection service. In certain embodiments, the captured image is a set of pixel values (e.g., of luminance and/or chrominance).

In certain embodiments, a defect detection service includes an application wire-frame (e.g., three-dimensional) rendering mode that simplifies the distinction between foreground and background content.

FIG. 1 is a diagram illustrating an environment 100 including a cloud provider network 102 having a defect detection service 108A according to some embodiments. Cloud provider network 102 may include one or more customer clouds, e.g., customer cloud 104-1 for a first customer (e.g., tenant) and customer cloud 104-N (where N is a positive integer greater than one) for one or more additional customers (e.g., tenants). One or more storage services, computing services, content delivery services (e.g., content delivery service 108D in FIG. 5), or other services may be implemented within cloud (e.g., multiple tenant) provider network 102. Each customer cloud may include one or more storage services (e.g., storage service(s) 106 for customer cloud 104-1) and/or one or more computing services (e.g., computing service(s) 108 for customer cloud 104-1). Example storage services are discussed below in reference to FIG. 4 and example computing services are discussed below in reference to FIG. 5. Each of the one or more storage services 106 and one or more computing services 108 may be implemented via software, hardware, or a combination of both, and may be implemented in a distributed manner using multiple different computing devices.

In certain embodiments, provider network 102 ("cloud" provider network) provides users (e.g., cloud customer via device 130) with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a computing service 108), a storage service 106 that can store data objects (e.g., videos), etc. The users (or "customers") of provider network 102 may utilize one or more user accounts that are associated with a customer account, though these terms may be used somewhat interchangeably depending upon the context of use. Users may interact with a provider network 102 across one or more intermediate networks 110 (e.g., the internet) via one or more interface(s), such as through use of application programming interface (API) calls, via a console implemented as a website or application, etc. The interface(s) may be part of, or serve as a front-end to, a control plane of the cloud provider network 102 that includes "backend" services supporting and enabling the services that may be more directly offered to customers.

For example, a cloud provider network 102 may refer to a large pool of accessible virtualized computing resources (such as compute, storage, and networking resources, applications, and services), e.g., a cloud for each customer. A customer cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network, etc.) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 102 may rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 102 by an on-demand code execution service (which may be one of compute service(s)) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 1040B) that can be executed on demand, without requiring the user to maintain dedicated infrastructure to execute the serverless function. Instead, the serverless functions can be executed on demand using resources maintained by the provider network 102. In some embodiments, these resources may be maintained in a "ready" state (e.g., having a pre-initialized runtime environment configured to execute the serverless functions), allowing the serverless functions to be executed in near real-time.

In certain embodiments, media player application 122 is to output video and/or audio on display/audio output 128, e.g., of a media file requested at 116 and provided at 118 by a customer cloud (e.g., content delivery service 108D in FIG. 5) to the end customer device 120 (e.g., where the viewer is a customer of cloud customer (e.g., operator) of device 130). In certain embodiments, selection of the media file (e.g., movie, show, etc.) to be played as playback 126 is via a (e.g., graphical) user interface 124 (e.g., the user interface including the page shown in FIG. 8). However, there may be a plethora of different types of end customer devices executing a media player application (e.g., and the media player application may have numerous configurations which change the user interface 124 being displayed, for example, different languages, media titles, etc.), and thus detection of defects in such numerous combinations is beyond what can be practically performed in the human mind (or by a human using a pen and paper).

Certain embodiments herein include a computer-implemented defect detection service 108A (e.g., used by an application release service) that detects visual defects in a user interface 124 of a media player application 122, e.g., media player application 122 that is executed on an end customer device 120 that is separate from the cloud provider network 102. Certain embodiments herein are directed to a computer-implemented defect detection service 108A that detects visual defects, in a user interface 124 of a media player application 122 displayed on a display 128 (e.g., with or without audio), outside of a playback 126 experience, for example, defects when interacting with login, browse, search, purchase, and settings pages, etc. of the user interface 124. In certain embodiments, the media player application 122 (e.g., video streaming application) is executed by an end customer device 120, for example, a living room device, e.g., a smart television, game console, set-top box, etc. Example visual defects that can be detected by defect detection service 108A include missing or incorrectly-positioned and/or colliding display components (for example, due to "z-ordering" defects, e.g., when two or more components overlap, their z-order determines which one appears on top of the other(s)), or an absence of text (for example, due to misconfigured font libraries, e.g., due to a failure to load the specified font).

In certain embodiments, the defect detection service 108A takes as its input a request that identifies (e.g., the Uniform Resource Locator (URL) to) the image (e.g., screen capture) to analyze along with metadata detailing the source of the capture (e.g., identifying a single page (e.g., that fills an entire display) of a plurality of pages of the user interface). In certain embodiments, the request includes metadata indicating (i) the media player application name (e.g., as a defect detection service can be used to test multiple media player applications, such as, but not limited to, an Amazon® Prime Video media player application, an IMDB® media player application, and/or a Twitch® media player application) (e.g., where each media player application of a plurality of media player applications has their own (e.g., different) rule sets) and/or (ii) the state of the application at the point of capture (e.g. whether in playback mode, although this can be auto-inferred in other embodiments).

In certain embodiments, the output of the defect detection service 108A indicates a type of defect (e.g., a z-order defect) and its location (for example, occupying all of the top-right of the page, e.g., indicating that the defect spans from 0% to 58.7% of the page height and from 48.0% to 100% of the page width as one example). In certain embodiments, the output of the defect detection service 108A indicates how many text characters were observed on the page, e.g., and how many characters were expected to be displayed.

Figure 11:
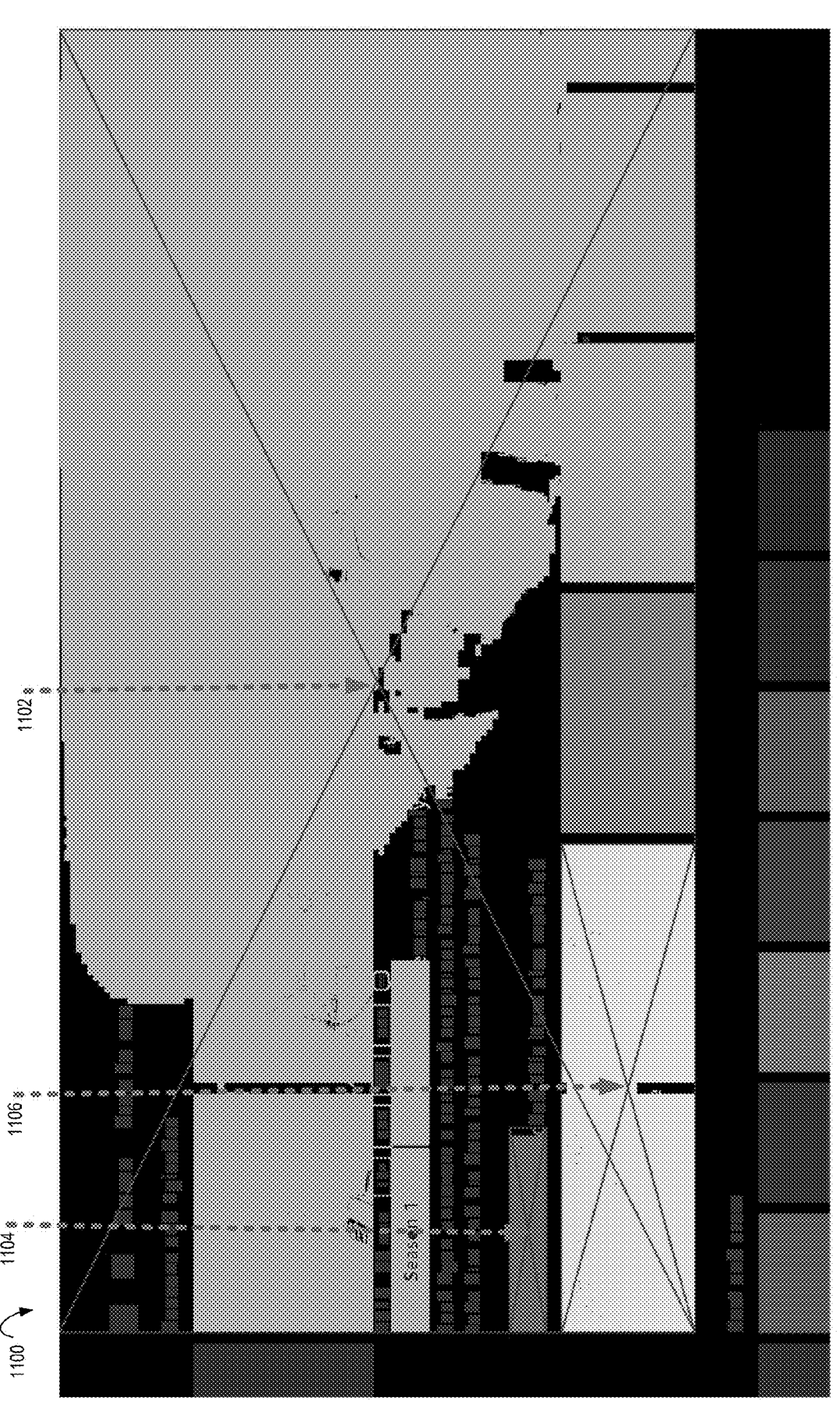
FIG. 11 is an example of a graphical user interface that illustrates detected defects for the captured application image in FIG. 8 according to some embodiments.

In certain embodiments, cloud customer (e.g., operator) device 130 includes a display 132 having a graphical user interface (GUI) 134, e.g., to display a query for cloud provider network to enter (or not) user interface defect detection mode. It should be understood that more than one end customer (e.g., and corresponding device 120) may utilize a single customer cloud. In certain embodiments, cloud customer device 130 is to send a request for cloud provider network 102 (e.g., defect detection service 108A thereof) to perform a defect detection on a user interface of a media player (e.g., a media player version that is not yet deployed to an end customer device) and receiving a corresponding response at 114, e.g., indicating any defect(s) in the user interface of the (e.g., candidate) media player (e.g., as shown in FIG. 11).

In certain embodiments, there is a link between the cloud customer device 130 and the display/audio output 128 of the end customer device 120, e.g., such that the cloud customer device 130 can output on its display 132 (e.g., and from its audio output) what the end customer device 120 is displaying (e.g., and outputting as audio).

Figure 2:
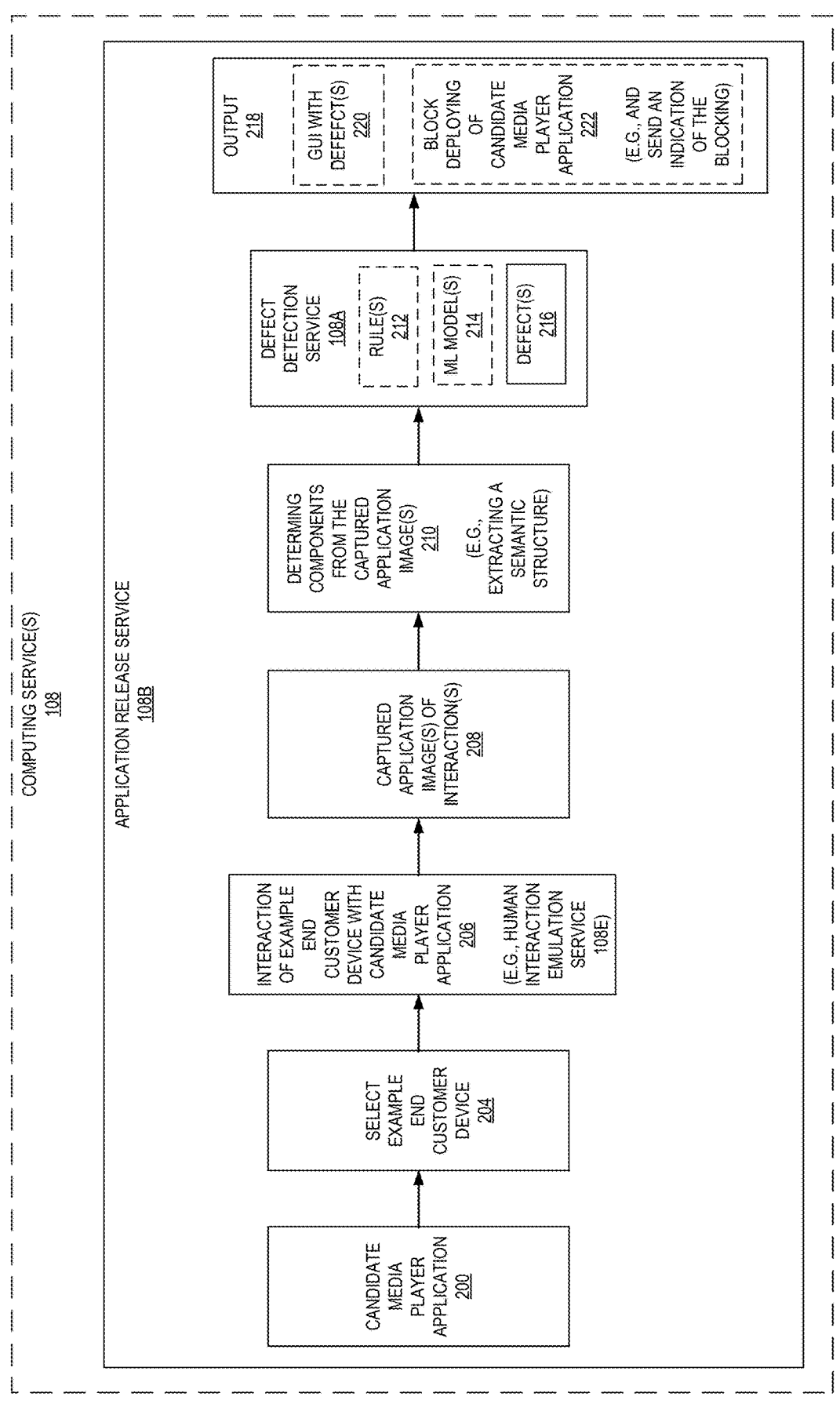
FIG. 2 is a diagram illustrating an application release service having a defect detection service according to some embodiments.

FIG. 2 is a diagram illustrating an application release service 108B (e.g., a deployment pipeline thereof) having a defect detection service 108A according to some embodiments. Although defect detection service 108A is shown within application release service 108B, it should be understood that defect detection service 108A may be separate from application release service 108B. In certain embodiments, an application release service 108B is to use the disclosed defect detection service 108A to determine one or more defects in a user interface of a media player application. In certain embodiments, application release service 108B is implemented within computing service(s) 108.

In certain embodiments, application release service 108B performs operations that take an input of a candidate media player application 200 (e.g., that has not been released by a developer) and selects an example one or more candidate end customer devices 204, e.g., from a "farm" of actual physical end customer devices and/or a set of virtual instances of end customer devices (e.g., implemented by computing services 108). In one embodiment, more than one instance of applicant release service 108B in FIG. 2 are performed in parallel.

In certain embodiments, the candidate media player application 200 is loaded onto the candidate end customer device 204, and an interaction is performed at 206, e.g., by a human interaction emulation service as discussed herein). In certain embodiments, the interaction at 106 includes navigating to (e.g., and selecting one or more navigation components of) various pages of a user interface (UI) of the candidate media player application 200, e.g., the login, browse, search, purchase, and settings pages.

In certain embodiments, one or more images (e.g., a single image for each interaction) are captured (e.g., as a screenshot) at 208.

Figure 8:
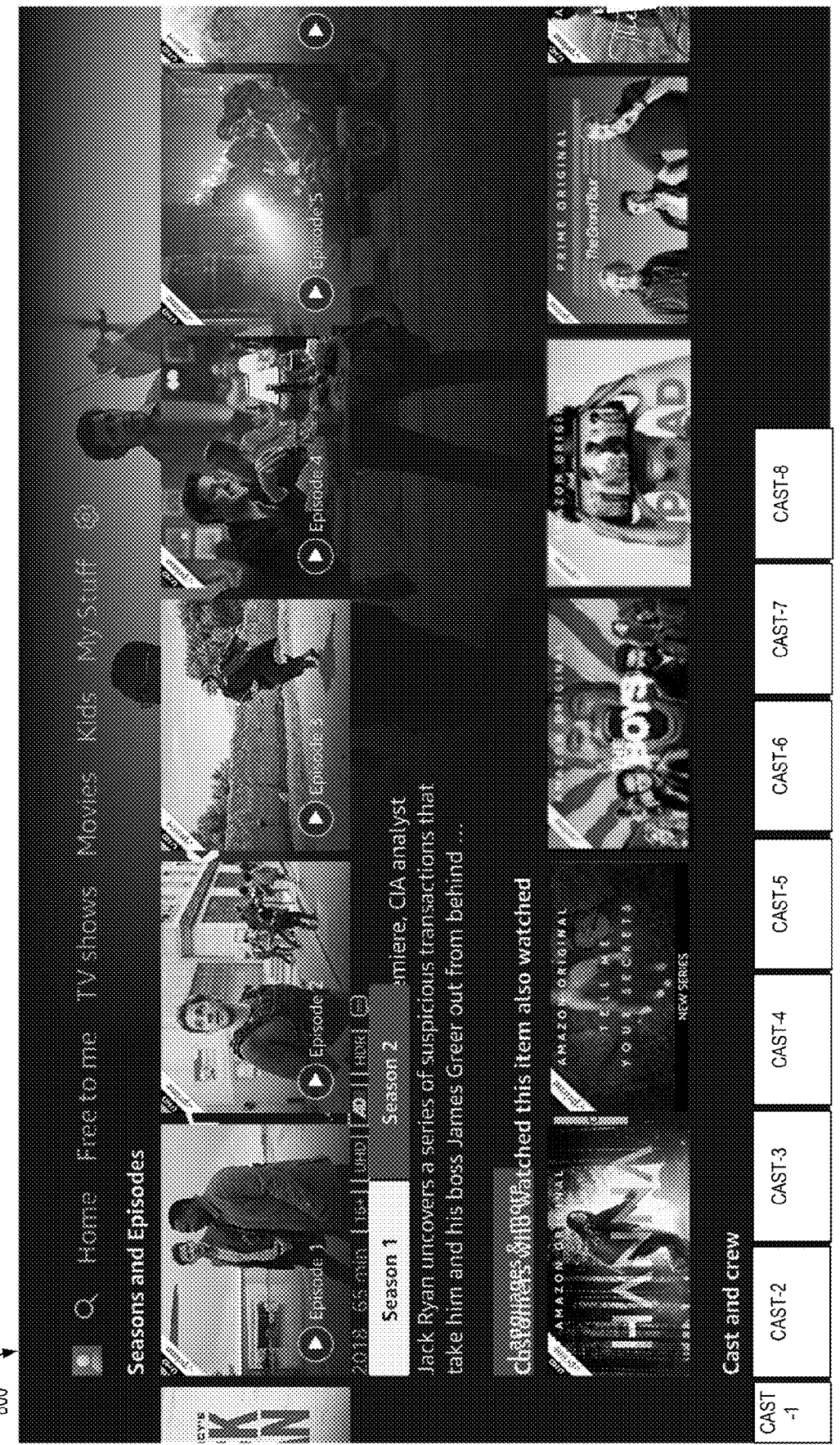
FIG. 8 is an example captured application image according to some embodiments.

In certain embodiments, the captured images are then used to determine one or more defects in the user interface, e.g., separate from any defect(s) in playback of the media itself that is being identified on the page(s). In certain embodiments, the components (e.g., a component level of granularity in contrast to a pixel level of granularity) are determined from the captured application image(s) at 210, e.g., via a semantic structure extraction as discussed herein. In certain embodiments, the components include an image (e.g., thumbnail) for a media (e.g., media file) (e.g., that when that image is selected, causes that media to play), recommendations of other media to view (e.g., based on statistics of what media other viewers of the current media have also viewed) (e.g., that when that image is selected, causes that other media to play or causes the displaying of a page directed to that media), an image of cast and/or crew of that media (e.g., that when that image is selected, causes the displaying of a page directed to that particular cast or crew). In certain examples, the components include one or more labeled interface elements, e.g., button, dropdown menu, etc. An example captured image of a user interface is depicted in FIG. 8 (although the images of the cast and crew have been redacted in this disclosure for "publicity rights" reasons).

In certain embodiments, the indication of components is then provided as an input to defect detection service 108A to detect one or more defects 216 in the user interface (e.g., in captured image 208 thereof) without involving the human mind (or a human using a pen and paper). In certain embodiments, one or more rules 212 are utilized to identify the one or more defects 216. In certain embodiments, one or more machine learning models 214 are utilized to identify the one or more defects 216.

In certain embodiments, a set of rules 212 includes: (i) a selection of axiomatic rules that provide baseline guarantees of correct layout across all pages, (ii) each component is strictly rectangular with clean edges (e.g., such that this rule is breached by two forms of layout issues: colliding components and localized component (e.g., button) labels spilling out from the containing component (e.g., button)), (iii) no component spans more than a certain percentage of the user interface page width and/or height, (iv) one or more components are present in a key region(s) of the page (e.g., in the top left region of the user interface), and/or (v) no component is a solid block of color (e.g., indicating that a component (e.g., button) label has not rendered). In certain embodiments, one or more rules are enabled and/or disabled according to the source application and page type (e.g., home page, detail page, search page, etc.). In certain embodiments, rules require (e.g., approximate) component placements which are defined in terms of page percentages (e.g., no change is required for a page rendered in high definition (HD) and 4K resolution). In certain embodiments, as well as detecting defects, rules can also be used to suppress defects detected by other rules (e.g., to support known page oddities, such as, but not limited to, an irregularly shaped component (e.g., button) at a certain location on certain page(s)). In certain embodiments, a machine learning model 214 is used to detect anomalies in the component specifications for each page, e.g., replacing the rules system.

In certain embodiments, the defect(s) 216 determined by the defect detection service 108A are used to provide an output 218 of the application release service 108B. In certain embodiments, the output 218 is an image (e.g., displayed on graphical user interface 220) that illustrates the defect(s), e.g., as shown in FIG. 11 or as can be shown as the image in FIG. 8 with the red boxes (e.g., Xs) from FIG. 11 overlaid on the components as shown in FIG. 8. Additionally or alternatively, in certain embodiments the output 218 includes the blocking 222 of the deployment (e.g., to an end user) of candidate media player application 200, e.g., blocking the deployment of that candidate media player application 200 to end customer devices selected at 204. In certain embodiments, blocking 222 includes sending (e.g., displaying) an indication of that blocking (e.g., to a developer).

Figure 3:
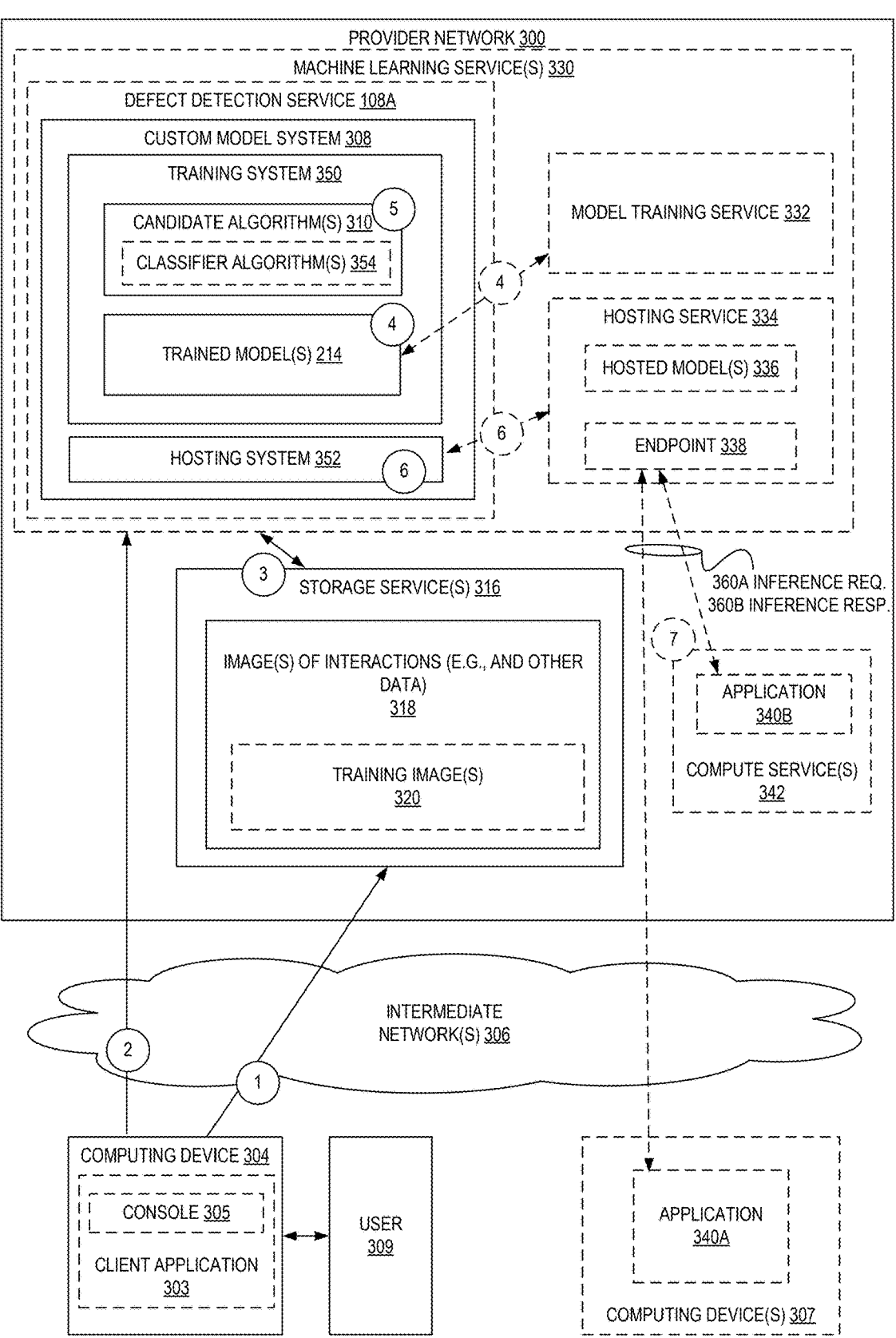
FIG. 3 is a diagram illustrating an environment for creating, training, and using a machine learning model according to some embodiments.

FIG. 3 is a diagram illustrating an environment for creating, training, and using a machine learning model according to some embodiments. FIG. 3 includes a defect detection service 108A, one or more storage services 316, one or more machine learning services 330, one or more model training services 332, one or more hosting services 334, and one or more compute services 342 implemented within a multi-tenant provider network 300. Each of the defect detection service 108A, one or more storage services 316, one or more machine learning services 330, one or more model training services 332, one or more hosting services 334, and one or more compute services 342 may be implemented via software, hardware, or a combination of both, and may be implemented in a distributed manner using multiple different computing devices.

A provider network 300 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 342), a storage service 316 that can store data objects (such as image of interaction(s) 318), etc. The users (or "customers") of provider networks 300 may utilize one or more user accounts that are associated with a customer account, though these terms may be used somewhat interchangeably depending upon the context of use. Users may interact with a provider network 300 across one or more intermediate networks 306 (e.g., the internet) via one or more interface(s), such as through use of application programming interface (API) calls, via a console 305 implemented as a website or application, etc. The interface(s) may be part of, or serve as a front-end to, a control plane of the provider network 300 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 300 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 300 by an on-demand code execution service (which may be one of compute service(s) 342) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 340B) that can be executed on demand, without requiring the user to maintain dedicated infrastructure to execute the serverless function. Instead, the serverless functions can be executed on demand using resources maintained by the provider network 300. In some embodiments, these resources may be maintained in a "ready" state (e.g., having a pre-initialized runtime environment configured to execute the serverless functions), allowing the serverless functions to be executed in near real-time.

The defect detection service 108A, in some embodiments, is a machine learning powered service that makes it easy for users to build and use trained model(s) 214, e.g., to build and use a trained model 214 that infers a defect in a user interface of a media player application based on an input of interaction image(s) 318.

The custom model system 308, for example, may enable users to generate trained models 214 from candidate algorithms 310, e.g., including one or more classifier algorithms (e.g., multi-class classifier). Embodiments herein allow a customer to create trained models 214 by supplying data, e.g., training images 320 of defects in a user interface (e.g., with labels of the defects). Images 318 may include (e.g., labeled) training data and/or evaluation data.

At a high level, machine learning may include two major components that are required to be put in place in order to expose advertised functionality to the customer: (i) training (e.g., by training system 350) and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a plurality of candidate models 310 and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 309 may provide or otherwise identify data 318 (e.g., training image files 320 and/or their labeled metrics) for use in creating a custom model. For example, as shown at circle (1), the user 309 may utilize a client application 303 executed by a computing device 304 (e.g., a web-application implementing a console 305 for the provider network 300, a standalone application, another web-application of another entity that utilizes the defect detection service 108A as a part of its backend, a database or mixed-SQL environment, etc.) to cause the computing device 304 to upload the image file(s) 318 to a storage location (e.g., provided by a storage service 316 such as an object storage service of a provider network 300).

The image 318 may be an image itself file and a (e.g., columnar) dataset that includes rows (or entries) of data values, where the data values may be arranged according to one or more columns (or attributes) and may be of a same datatype (e.g., one storing text). In some cases, the data 318 includes headings or other metadata describing names or datatypes of the columns, though in some cases this metadata may not exist. For example, some or all of the data 318 may have been provided by a user as a plaintext file (e.g., a comma-separated values (CSV) or tab-separated values (TSV) file), an exported database table or structure, an application-specific file such as a spreadsheet, etc.

For example, when a user 309 desires to train a candidate algorithm 310 (e.g., classifier algorithm 354), this file (or files) may be a CSV with at least two values per row—e.g., one column storing metric label, such as a defect metric, and another column storing an image ID that indicates the corresponding image(s) for that metric label, e.g., "metric, imageID".

Thereafter, at circle (2) the computing device 304 may issue one or more requests (e.g., API calls) to the machine learning service 330 that indicate the user's 309 desire to train one or more candidate algorithms 310 into one or more trained models 214. The request may be of a type that identifies which type of model(s) are to be created or identifies that the machine learning service 330 itself is to identify the candidate algorithms(s) 310. The request may also include one or more of an identifier of a storage location or locations storing the data 318 (e.g., an identifier of the training images 320 and/or defect metrics), which may identify a storage location (e.g., via a Uniform Resource Locator (URL), a bucket/folder identifier, etc.) within the provider network 300 (e.g., as offered by a storage service 316) or external to the provider network 300, a format identifier of the data 318, a language identifier of the language of the data 318, etc. In some embodiments, the request includes an identifier (e.g., from the user 309) of the candidate algorithms(s) 310 themselves within the request.

Responsive to receipt of the request, the custom model system 308 of the machine learning service 330 is invoked and begins operations for training the corresponding type of model. For example, the custom model system 308 may identify what type of model is to be trained (e.g., via analyzing the method call associated with the request), the storage location(s) associated with the data 318 (e.g., training image files 320 and/or labeled defects), etc. Thus, the custom model system 308 may retrieve any stored data 318 (e.g., videos) as shown at circle (3), which may be from a storage location within the provider network 300 or external to the provider network 300.

In some embodiments, the training (at circle (4)) of the candidate algorithms 310 includes performing (at optional, dotted circle (4)) candidate algorithms 310 by training service 332 of machine learning service 330 described herein a particular training job (e.g., hyperparameter optimization tuning job), or the like. In some embodiments, the machine learning services 330 includes (at optional, dotted circle (5)) selecting of a proper subset of candidate models from a plurality of candidate algorithms 310 for training by training service 332. In some embodiments, the hosting system 352 (at circle (6)) of the custom model system 308 may make use (at optional, dotted circle (6)) of a hosting service 334 of a machine learning service 330 to deploy a model as a hosted model 336 in association with an endpoint 338 that can receive inference requests from client applications 340A and/or 340B at circle (7), provide the inference requests 360A to the associated hosted model(s) 336, and provide inference results 360B (e.g., a defect prediction, including, but not limited to, predicted classes, predicted entities, predicted events, etc.) back to applications 340A and/or 340B, which may be executed by one or more computing devices 307 outside of the provider network 300 or by one or more computing devices of a compute service 342 (e.g., hardware virtualization service, serverless code execution service, etc.) within the provider network 300. Inference results 360B may be displayed to a user (e.g., in a graphical user interface of the application) and/or exported as a data structure (e.g., in a selected format). The trained model 214 may then be used, e.g., within defect detection service (or system) 108A.

Figure 4:
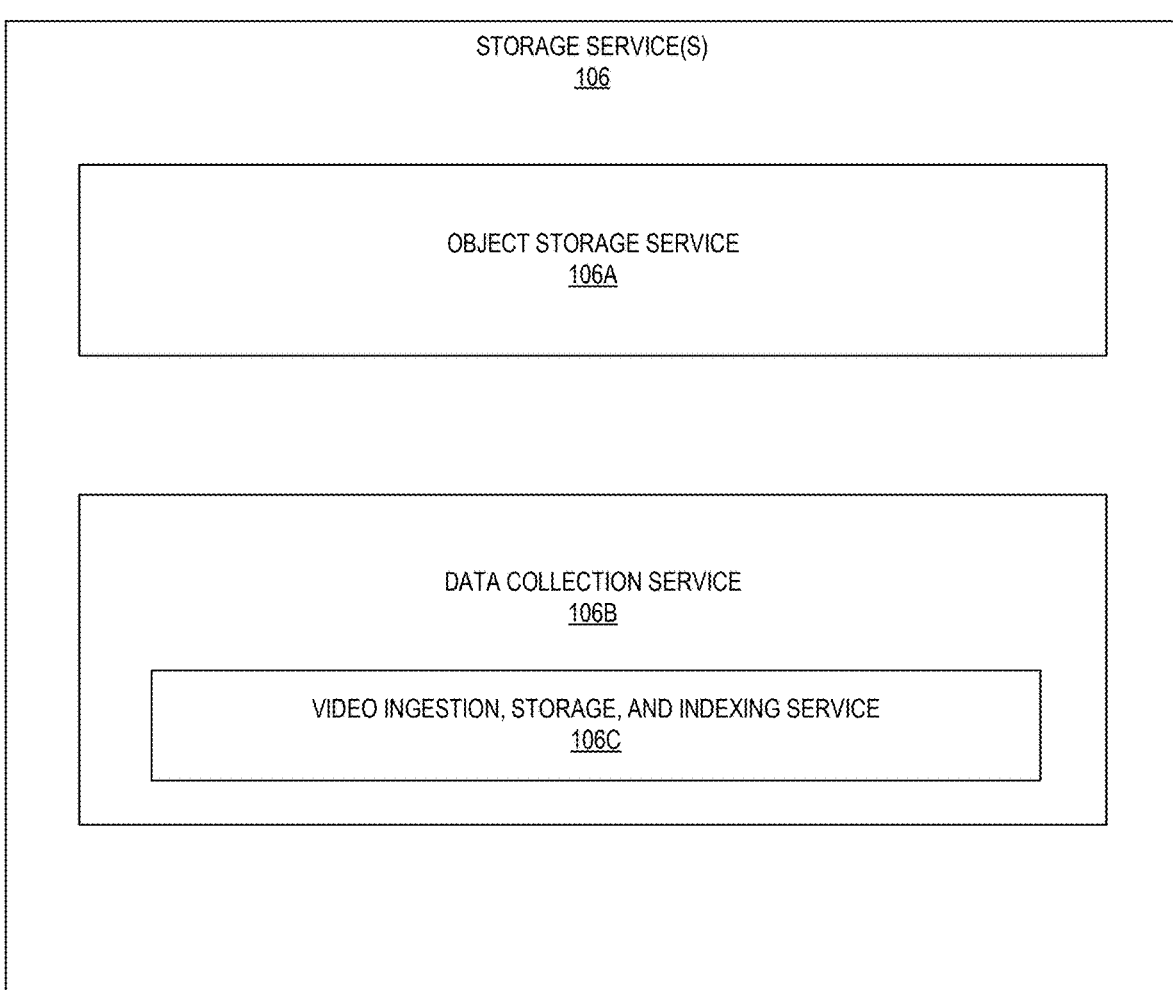
FIG. 4 is a diagram illustrating example storage services according to some embodiments.

FIG. 4 is a diagram illustrating example storage services 106 according to some embodiments. Storage services 106 may include an (e.g., scalable) object storage service 106A to store one or more objects and/or a (e.g., real-time streaming) data collection service 106B to collect one or more items of data (e.g., including a video ingestion, storage, and indexing services 106C).

Figure 5:
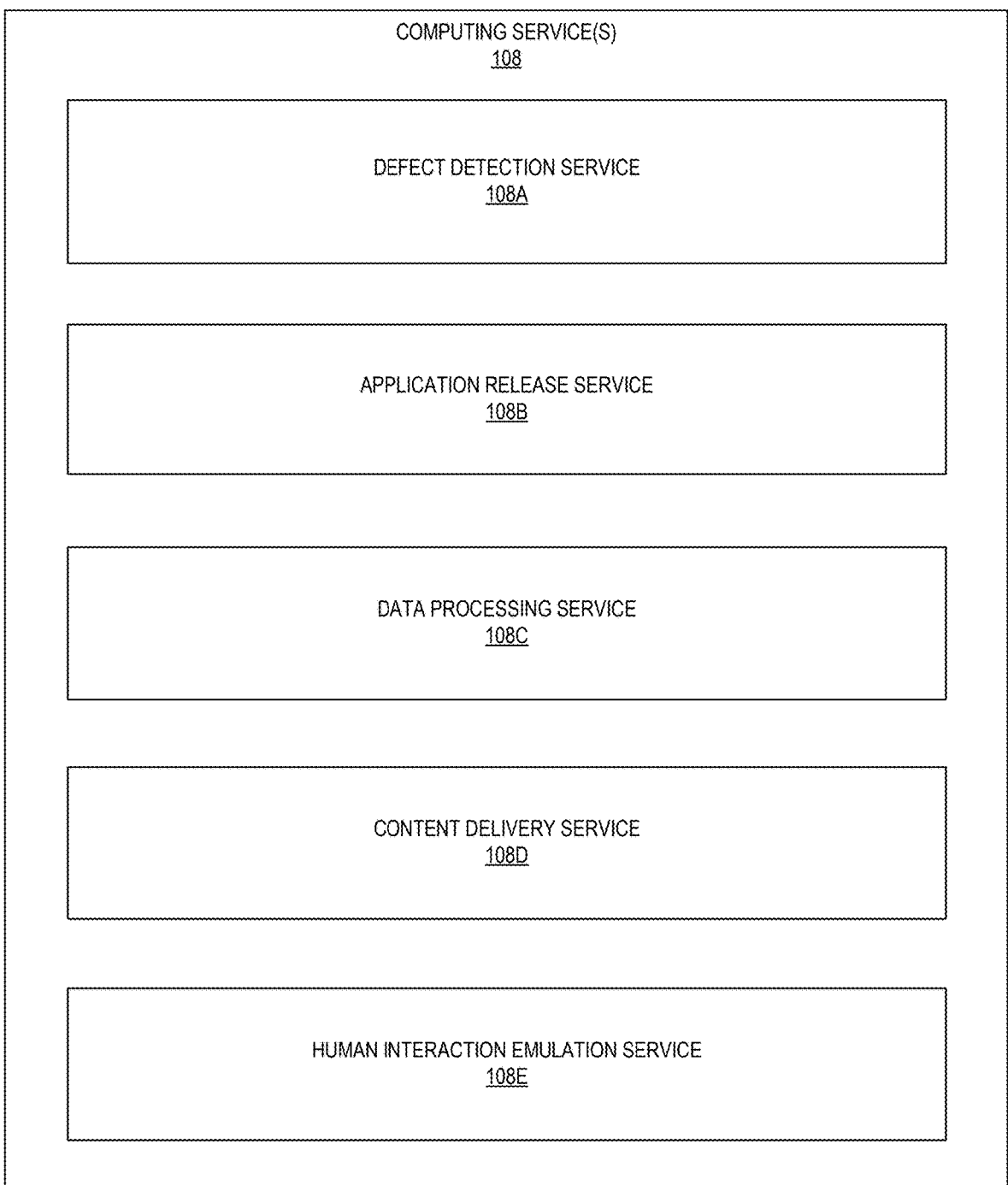
FIG. 5 is a diagram illustrating example computing services according to some embodiments.

FIG. 5 is a diagram illustrating example computing services 108 according to some embodiments. Computing services 108 may include defect detection service 108A, application release service 108B (e.g., that utilizes defect detection service 108A), data processing service 108C (e.g., to perform web indexing, data mining, log file analysis, machine learning, financial analysis, and/or scientific simulation, content delivery service 108D (e.g., to securely deliver data, videos, applications, and/or application programming interfaces (APIs)), and/or a human interaction emulation service 108E (for example, that, without human interaction, navigates to (e.g., and selects one or more navigation components of) various pages of a user interface (UI) of a media player application, e.g., the login, browse, search, purchase, and settings pages). In certain embodiments, the human interaction emulation service 108E requests the defect detection service 108A perform its operations.

In certain embodiments, the defect detection service 108A includes a classifier model (e.g., ML model 214 in FIG. 2 or 3). As one example, in response to receiving a request, the defect detection service 108A (e.g., or application release service 108B or other service) downloads the captured application image (CAI) (e.g., from the specified URL) and passes it (e.g., along with the application metadata) to the classifier model. In certain embodiments, the classifier model includes four stages: (1) Model Assembly, (2) Classification, (3) Report Metrics, and (4) Response Generation. The below discusses examples for each of these stages in detail.

(1) Model Assembly

In certain embodiments, the model assembly stage of the classifier model transforms the CAI (e.g., represented as a two-dimensional grid of colored pixels) into objects representing the properties of each of the UI components present on the page for onward analysis.

Mode Selection

In certain embodiments, the first part of assembly is determining which of a plurality (e.g., 2) modes will be used during assembly and classification, e.g., PLAYBACK or DEFAULT. In certain embodiments, the nature of the PLAYBACK page is significantly different from the others presented by the media player application and these differences are exploited during onward processing. As well as differences in the expected shapes and positioning of components on PLAYBACK versus DEFAULT pages, in certain embodiments, PLAYBACK images make use of a (e.g., alpha) channel to display foreground user interface components over media (e.g., video) content.

In certain embodiments, the classification mode is set to PLAYBACK when the incoming page name metadata indicates it is for starting playback (e.g., START_PLAYBACK) and the CAI has a non-uniform alpha channel. In certain embodiments, the alpha-channel check ensures that the application error page (e.g., which does not use PLAYBACK design elements) is correctly processed even when reported by the application as a START_PLAYBACK page.

Foreground Extraction

In certain embodiments, the second part of assembly is extracting the foreground pixels from the CAI, converting the CAI to a binary image where a certain color (e.g., black) indicates background content and a different color (e.g., white) indicates foreground content. In certain embodiments, the process makes use of a reference gradient background image (RGBI), e.g., and operates as discussed in reference to FIG. 6.

FIG. 6 is a flow diagram illustrating operations 600 of a method for determining components from a captured application image according to some embodiments. The operations 600 include, at block 602, receiving a captured application image of a user interface of a media player application. The operations 600 further include, at block 604, checking if PLAYBACK mode is selected (e.g., such that the media is being played by the media player and secondary content of an alpha channel is inserted over the media (e.g., video)), and if yes, extracting the foreground by the alpha channel at block 606 (e.g., such that pixels whose alpha intensity (e.g., opacity) are over a threshold (e.g., 75%) are considered foreground content), and if no, proceeding, at block 608, to identify the primary background color (PBC) (e.g., by (e.g., randomly) sampling the CAI pixels to find the most common color (e.g., with low red, green, and blue (RGB) values)). The operations 600 further include, at block 610, identifying whether a gradient (e.g., directional change in the intensity and/or color in an image)

background is present and checking at block 612 if a gradient background is present, and if no, extracting the foreground by PBC at block 616 (e.g., where all pixels which are not a (e.g., close) match to the PBC are considered foreground content), and if yes, removing the background gradient from the CAI at block 614 (e.g., replacing all CAI pixels at location where they (e.g., closely) match the RGBI with the PBC), and then extracting the foreground by PBC at block 616 (e.g., where all pixels which are not a (e.g., close) match to the PBC are considered foreground content).

Figure 10:
FIG. 10 is an example of connected component labelling (shown in color) for the captured application image in FIG. 8 according to some embodiments.

In certain embodiments, with the foreground content available, the defect detection service is then to determine the components (e.g., each being a plurality of pixels) of the user interface from pixels of the image, for example, by performing a connected component labelling. In certain embodiments, connected component labelling utilizes a computer vision algorithm to efficiently link all adjacent foreground pixels into discrete interconnected components. In certain examples, the output of this also returns statistics for each component which was identified, e.g., including the bounding box coordinates and the number of foreground pixels included. FIG. 10 illustrates an example output of connected component labelling with the coloring of each identified component in a discrete color.

In certain embodiments (e.g., from this point forward), all the identified components are processed in isolation, for example, where the boundary of a first component overlaps with a smaller component(s), these components will have no awareness of each other's presence during each stage of onward processing.

Skippable Component Identification

In certain embodiments, the defect detection service performs an (e.g., quick) inspection of each component (e.g., identified by connected component labelling) to see whether further processing is necessary. In certain embodiments, components are skipped from further processing if they: (i) have an area (e.g., the number of foreground pixels included in the component) less than a threshold (e.g., 16 pixels), for example, where these tiny components typically occur at the edge of (e.g., hero) images as they fade out to meet the uniform page background (e.g., reason=NOISE), (ii) have insufficient height and/or width to qualify as a valid user interface (UI) component, e.g., where these components typically represent the individual text characters, and, unlike the tiny "noise" components, the classifier maintains a count of these components which is reported in the response as the approximate number of characters present on the page (e.g., reason=UNDERSIZED), (iii) have insufficient intensity to qualify as foreground content, e.g., where these are typically larger regions of an (e.g., background image as shown in FIG. 8) image which has become disconnected as the image fades out to the (e.g., non-image) background color, and note that to measure the intensity the service is to refer back to the CAI for all coordinates occupied by the component's pixels (e.g., reason=LOW_INTENSITY), and/or (iv) have height and width which exactly match those of another component on the page, e.g., these components can be safely discarded as it is highly unlikely that an unplanned collision between elements on the page would result in multiple components featuring exactly the same dimensions (e.g., reason=DUPLICATED_DIMENSIONS).

In certain embodiments, a lead (e.g., "hero") image is used to illustrate a media file, for example, the background image shown in FIG. 8.

Note that skipping components is more than an optimization. In certain embodiments, classification is primarily focused on assessing the regularity of component edges, e.g., by skipping components at this stage it: (i) simplifies the later task of classification, particularly by skipping smaller components whose short edges are naturally less regular (e.g., they have no opportunity to contain long linear spans), and/or (ii) significantly reduces the chance of false positives, e.g., where title images can be any color, including those used by the UI background, resulting in components with irregular edges being returned from foreground extraction and connected component labelling processing and/or the majority of title images are presented in carousels with the same height and width of their neighbors, allowing them to be swiftly discarded (e.g., where title images feature at least one span of non-background-color pixels reaching each edge of the bounding box).

Edge Evaluation

FIG. 7 are example matrices for edge evaluation of a captured application image according to some embodiments. In certain embodiments, the defect detection service inspects the edges of each remaining component before finalizing the model. As shown in FIG. 7, the process converts each edge (TOP, BOTTOM, LEFT, and RIGHT) of a component to an array of numbers (e.g., integers) by scanning along the edge and recording the location of the closest populated pixel on the perpendicular axis. For example, for example matrix 701, when inspecting the top edge, the process starts on column 0 and sees that the closest populated row is 4, so top[0]=4; likewise for column 1, the closest populated row is 3, so top[1]=3, etc., when inspecting the bottom edge, the process starts on column 0 and sees that the closest populated row is 6, so bottom[0]=6; likewise for column 1, the closest populated row is 4, so bottom[1]=4, etc., when inspecting the left edge, the process starts on row 0 and sees that the closest populated column is 2, so left[0]=2; likewise for row 1, the closest populated column is 3, so left[1]=3, etc., and when inspecting the right edge, the process starts on row and 0 and sees that the closest populated column is 8, so right[0]=8; likewise for row 1, the closest populated column is 7, so right[1]=7, etc. In certain embodiments, these values are computed relative to the minimum coordinates of the bounding box and there is guaranteed to be at least one pixel present in every column and row.

Example matrix 702 and example matrix 703 are discussed below.

Model Construction

With processing complete, in certain embodiments, the defect detection service (e.g., model) assembles the output. An example output is:

---

OUTPUT:

---

```
Page[
  page_name: CATEGORY_PAGE
  bounds: [start=(0, 0), height=1080, width=1920]
  components: [
```

-continued

---

OUTPUT:

---

```
Component[
    bounds: [start=(398, 80), height=209, width=356]
    quadrant: TOP_LEFT
    component_img: < extracted subimage of the CAI at the component's location, see examples below>
    edges: [
        Edge[position=TOP, values=[2, 1, 0, 0, 0, 0, 0, 0, 0, 0, . . . ]]
        Edge[position=BOTTOM, values=[206, 207, 208, 208, 208, 208, 208, 208, 208, . . . ]]
        Edge[position=LEFT, values=[2, 1, 0, 0, 0, 0, 0, 0, 0, 0, . . . ] ]
        Edge[position=RIGHT, values=[353, 354, 355, 355, 355, 355, 355, 355, 355, 355, . . . ]]
    ]
    ],
    Component[
        bounds: [start=(816, 1494), height=264, width=426]
        quadrant: BOTTOM_RIGHT
        component_img: < extracted subimage of the CAI at the component's location, see examples below>
        edges: [
            Edge[position=TOP, values=[1, 0, 0, 0, 0, 0, 0, 0, 0, 0, . . . ]]
            Edge[position=BOTTOM, values=[263, 263, 263, 263, 263, 263, 263, 263, 263, 263, . . . ]]
            Edge[position=LEFT, values=[1, 0, 0, 0, 0, 0, 0, 0, 0, 0, . . . ]
            Edge[position=RIGHT, values=[334, 335, 335, 335, 335, 335, 335, 335, 335, 335, . . . ]]]
        ]
    ],
]
skippedComponents: [
    SkippedComponent[bounds=[start=(125, 397), height=40, width=27], reason=UNDERSIZED],
    SkippedComponent[bounds=[start=(126, 91), height=38, width=32], reason=UNDERSIZED],
    . . .
]
]
```

---

In certain embodiments, the output includes additional details that will be useful during later processing, for example, (i) the quadrant (e.g., where on the page the component resides) (e.g., reporting defective components by quadrant provides effective categorization/aggregation of the different issues being encountered on pages) (e.g., components which span multiple quadrants will identify a single quadrant with the following precedence: TOP_LEFT, BOTTOM_LEFT, TOP_RIGHT, BOTTOM_RIGHT) and/or (ii) the component image (e.g., the extracted sub-image of the CAI at the component's location). In certain embodiments, all pixels not included in the component's foreground are zeroed-out (e.g., including their alpha channels).

FIG. 8 is an example captured application image 800 according to some embodiments. Depicted captured application image 800 is a page of a user interface that includes components that are colliding, for example, the Season 1 and Season 2 buttons are overlaid onto text discussing the series and the Languages & More button is also overlapping with text of "Customers who watched this item also watched". Note that the images of the cast and crew have been redacted for "publicity rights" reasons as shown here but is not so required by a defect detection service.

In certain embodiments, a detected defect is a button (e.g., an Add to Watchlist button) that overlaps the title images appearing above and below this location. In certain embodiments, a title image had colors similar to those in a background gradient and this causes the irregular edges in the rectangle of foreground pixels detected at this location.

Figure 9:
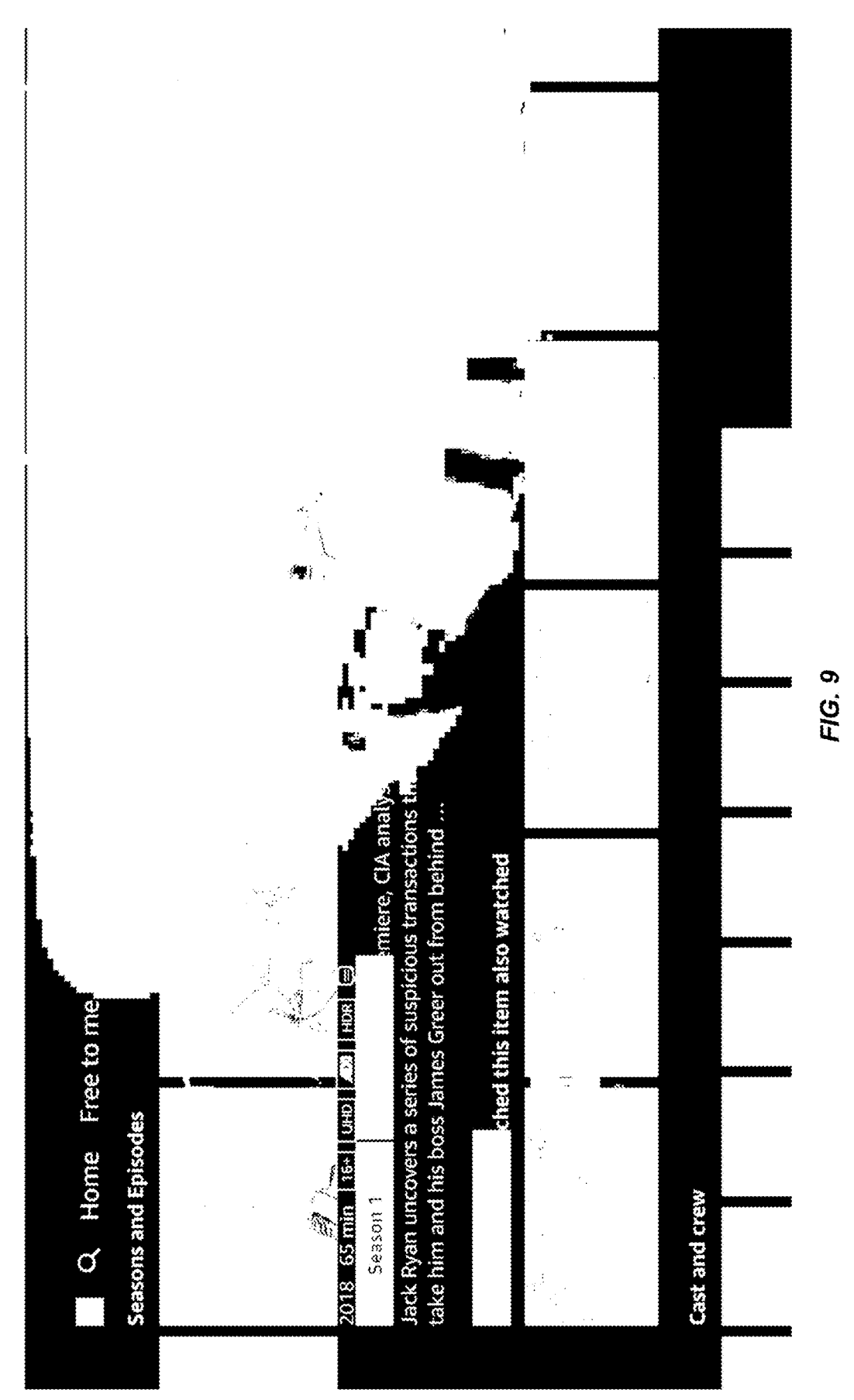
FIG. 9 is an example of foreground (shown in white) and background (shown in black) for the captured application image in FIG. 8 according to some embodiments.

FIG. 9 is an example 900 of foreground (shown in white) and background (shown in black) for the captured application image in FIG. 8 according to some embodiments (e.g., the operations 600 in FIG. 6). FIG. 9 shows that the background (e.g., "hero") image from FIG. 8 is identified as foreground content as its pixels match neither the PBC nor RGBI.

FIG. 10 is an example 1000 of connected component labelling (shown in color) for the captured application image in FIG. 8 according to some embodiments. In certain embodiments, each same colored item is considered a single identified component.

FIG. 11 is an example of a graphical user interface that illustrates detected defects for the captured application image in FIG. 8 according to some embodiments. This is discussed in further detail below.

(2) Classification

In certain embodiments, the second stage of the defect detection service is to inspect the assembled model (e.g., results thereof) and determine whether any of the components contain a (e.g., z-order) defect.

In certain embodiments, the design of this stage is handled by a selection of component classifiers which will inspect the page in turn. In certain embodiments, each of these classifiers will either detect a known type of component defect and/or suppress a known false-positive defect. In certain embodiments, once all classifiers (e.g., detectors and suppressors) have been run the overall page classification is output to indicate if there is a defect or no defect (e.g., DEFECT vs NO_DEFECT) inferred based on whether any of the components have a non-suppressed defect.

In certain embodiments, the component classifiers used depends on the evaluation mode selected during model assembly, for example, (1) PLAYBACK including one or more of an irregular edge detector, subtitle suppressor, title text suppressor, and/or a secondary content (e.g., from an alpha channel) (e.g., button) suppressor, and/or (2) DEFAULT including one or more of a horizontal bleed detector, uncontained edge detector, matching mode span detector, add to watch list suppressor, confirmation page background (e.g., hero) image suppressor, confirmation page logo suppressor, and/or a language popup suppressor. What follows is a discussion of example details of each classifier.

PLAYBACK: Irregular Edge Detector

In certain embodiments, this (e.g., single) playback defect detector looks for non-uniformity in each edge's array of values. In certain embodiments, to provide some leniency (e.g., compensating for any rounded corners, rasterizing, anti-aliasing, etc.), a component is recorded as defective if any edge's average mean error is greater than 1 (e.g., where on average, all edge values must be within 1 of that edge's mean value).

PLAYBACK: Subtitles Suppressor

In certain embodiments, subtitles cause a component with irregular sides to be displayed in the center of the page. In certain embodiments, this suppressor suppresses defects on components which are in the lower threshold (e.g., 60%) of the page, e.g., and have equal distance to the left & right edges of the page.

PLAYBACK: Title Text Suppressor

In certain embodiments, a playback page contains very small components, e.g., a square play button and a scrubber (e.g., horizontal slider) control which are placed side-by-side towards the bottom of the page. To ensure that these components are included in z-ordering analysis, in certain embodiments, the minimum size threshold beneath which small components are skipped when in PLAYBACK mode is set to a predetermined (e.g., 5 pixels×20 pixels) block of pixel height×pixel width. In certain embodiments, this small threshold allows larger characters (e.g., a capitalized letter) which appear in the title text to be processed as a valid component resulting in an irregular edge detection. In certain embodiments, this suppressor suppresses all defects smaller than a threshold (e.g., 50×50 pixels) which appear in a certain location (e.g., the top 20%) of the page.

PLAYBACK: Secondary Content (e.g., Amazon® X-Ray button) Suppressor

Secondary content, such as that provided by an Amazon® X-Ray button, may include the display of cast information (e.g., actor bios, photos, filmographies, and/or character backstories), song title of a song being played in the media, clip sharing capabilities for a user to share their favorite scenes and moments with friends and family over social media, trivia, hidden features or messages (e.g., "Easter eggs"), bonus media content (e.g., behind the scenes footage), sports statistics (e.g., real-time) for a sporting event, enhanced replays (e.g., completion probability, visual play routes, and/or sports trivia), player/team information (e.g., player biographies, career stats, and/or team details), and/or fan-polling features to make predictions before and during a sporting event (e.g., game) and watch in real time as that user's predictions stack up against other user's predictions).

Turning again to FIG. 7, example matrix 702 is for edge evaluation of a captured application image according to some embodiments. In certain embodiments, the defect detection service inspects the edges of a secondary content indication (e.g., Amazon® X-Ray) button that has a deliberately irregular shape as shown in matrix 702.

In certain embodiments, this suppressor suppresses any defect occurring in the lower or upper percentage (e.g., lower 70%) and left or right percentage (e.g., right 20%) of the page whose edges have average mean errors which match those of the (e.g., X-Ray) button, for example, TOP=5.0, BOTTOM=4.5, LEFT=0.0, RIGHT=1.0. For matrix 702, the expected errors would be 1.0, 1.0, 0.0, & 0.6, respectively.

DEFAULT: Horizontal Bleed Detector

In certain embodiments, this detector classifies any component which spans more than a threshold percentage (e.g., 80%) of the page width and extends to the (e.g., right-hand) edge of the page as a defect. In certain embodiments, this detector detects the large aqua component 1002 in FIG. 10 (e.g., which is then determined to be a defect as discussed herein).

DEFAULT: Uncontained Edge Detector

In certain embodiments, this detector inspects each "linear" edge to see whether there are any high-intensity pixels appearing "outside of that edge's modal value".

For example, where "linear" is a first check that confirms whether the edge is intended to be straight, e.g., it is not the curved edge of a (e.g., hero) image. In certain embodiments, to be linear, a certain percentage (e.g., 40%) or more of an edge's values must have the same value. For example, where all 4 edges of the button shown in matrix 702 would be identified as linear (e.g., if this detector ran on the playback page), but only the LEFT and RIGHT edges of the component shown in matrix 701 in FIG. 7 would be linear (e.g., where the BOTTOM and TOP edges are 36% & 27% linear, respectively). In certain embodiments, edges which are not identified as linear are recorded for metrics but otherwise ignored for onward investigation by this classifier.

For example, where "outside of that edge's modal value" is where the classifier identifies the edge's most-common value (e.g., the statistical mode) and then inspects all pixels above/below/left/right of that coordinate depending on which edge is being processed, e.g., using the button graphic in matrix 702, the mode of the RIGHT edge is 7, and because this is the RIGHT edge, processing would find all 4 populated pixels to the RIGHT of this value (e.g., those in columns 8 & 9). Using the button graphic in matrix 702, the modal value for the TOP edge is 0, so processing would inspect all pixels with row index<0 (of which there are none), and likewise for the LEFT (column index<0) and BOTTOM (row index>8) edges. In certain embodiments, the reason for doing this is that slight differences in the expected gradient can result in background-like pixels being attached to the component edge, making the edge appear irregular and leading to false positives (e.g., and in other embodiments, this detector instead strips out near-background pixels during foreground extraction, but this may increase the chance of not being able to find edges altogether). By performing this extra analysis, in certain embodiments, the detector confirms that any protrusions from the component is foreground content and represents a genuine collision in UI components. In certain embodiments, this detector detects the defect 1004 in FIG. 10 (shown underlined in this paragraph) that the letter "c" in "Customers who watched this item also watched" protrudes from the "Languages & more" button as shown further in FIG. 8 (e.g., with that magenta block 1004 including the letter "c" identified as a single "component" to be evaluated for defect(s)).

DEFAULT: Matching Mode Span Detector

In certain embodiments, this detector identifies matches issues caused by user interface components being connected together by being placed on top of other content, for example, as can be seen (and is detected) in component 1006 in FIG. 10.

Turning again to FIG. 7, example matrix 703 is for edge evaluation of a captured application image according to some embodiments. In certain embodiments, the defect detection service inspects the edges of component 1006 in FIG. 10 as shown in matrix 703.

In this example, the TOP edge has mode 0, while the opposite BOTTOM edge has mode 7. Inspecting the TOP edge values, there is a "span" of mode values from index 0 to index 5, and a second "span" from index 8 to 11. These spans are identical on the BOTTOM edge (e.g., with mode=7), resulting in 2 matched mode spans between these edges. In certain embodiments, the detector only requires a single matched span to classify a component as defective. In this example, no matching mode span is detected on the LEFT and RIGHT edges as spans greater than a certain percentage (e.g., 80%) of the edge length are excluded from matches, as these would classify all components as defective (e.g., with a 20% margin to compensate for rounded corners, etc.).

DEFAULT: Button (e.g., Add to Watchlist Button) Suppressor

In certain embodiments, a floating (e.g., Add to Watchlist) button combines with the title images behind resulting in an uncontained edge defect being detected (e.g., on a RIGHT edge) and a Matching Mode Span being detected (e.g., between the TOP & BOTTOM edges).

In certain embodiments, this suppressor suppresses any defective component on the CATEGORY PAGE, OPEN_HOME_PAGE, or OPEN_DETAIL_PAGE, e.g., which is in the lower right corner and extends to the right hand side of the page.

DEFAULT: Confirmation Page Background (e.g., Hero) Image Suppressor

In certain embodiments, a (e.g., channel signup confirmation) page features background (e.g., "hero") graphics which often have near-linear edges, resulting in an Uncontained Edge defect being detected on any of the edges.

In certain embodiments, this suppressor suppresses any defective component on the NEW_ CONFIRMATION_PAGE which occupies more than a threshold percentage (e.g., 60%) of the page height and width, e.g., and is centered in the top-right of the page.

DEFAULT: Confirmation Page Logo Suppressor

In certain embodiments, a (e.g., channel signup confirmation) page features a channel logo or logos which have near-linear edges, resulting in an Uncontained Edge defect being detected on any of the edges.

In certain embodiments, this suppressor suppresses any defective component on the NEW_ CONFIRMATION_PAGE contained within the top percentage (e.g., top 20%) and left percentage (e.g., 30%) of the page.

DEFAULT: Language Popup Suppressor

In certain embodiments, this suppressor suppresses the Uncontained Edge and Matching Mode Span defects which occur when a (e.g., language) popup is overlayed in a page, e.g., the center of the home page.

In certain embodiments, this suppressor suppresses defective components on the OPEN_HOME_PAGE when the (e.g., language) popup is present, confirmed by reading all pixel values in the center of the CAI and checking that a sufficient number match the certain (e.g., orange and grey) colors used by the popup.

(3) Report Metrics

In certain embodiments, once all components have been classified (e.g., by the detectors and/or suppressors), the defect detection service generates process metrics before constructing and returning a response.

In certain embodiments, the data needed to generate the metrics is captured in the page model as a classification result and a series of observation strings recorded against each component, and this stage passes the object to an internal metrics handler. In certain embodiments, the following metrics are issued for all calls to a (e.g., Zed Ordering) Classifier:

| METRICS: | | |
| --- | --- | --- |
| Metric Name | Dimensions | Value |
| Requests | pageName = ALL | 1 |
| Requests | pageName = < application_page_name> | 1 |
| Components | pageName = < application_page_name> & componentType = classified | <number of unskipped components> |
| Components | pageName = < application_page_name> & componentType = duplicatedDimensions | <number of components skipped with reason = DUPLICATED_DIMENSIONS> |
| Components | pageName = < application_page_name> & componentType = lowIntensity | <number of components skipped with reason = LOW_INTENSITY> |
| Components | pageName = < application_page_name> & componentType = undersized | <number of components skipped with reason = UNDERSIZED> |
| Observation | pageName = < application_page_name> & observation = < observation_name> (The metric is repeated for all observations made during classification. These indicate which defect and suppression rules were activated, along with any other findings, e.g. presence of non-linear edges.) | <number of times the observation was made when processing all of the page's components> |
| Latency | pageName = < application page name> | <number of milliseconds taken to assemble and classify the model> |

In certain embodiments, the following metrics are (e.g., also) issued if the page contains a component with an unsuppressed defect:

Metrics for Defect(s):

| Metric Name | Dimensions | Value |
| --- | --- | --- |
| Defects | pageName = ALL | 1 |
| Defects | pageName = < application_page_name> | 1 |
| DefectFound | pageName = < application_page_name> & quadrant = < component_quadrant> (The metric is repeated for all quadrants specified by defective components on the page.) | <number of defective components which specify the quadrant> |

-continued

| Metric Name | Dimensions | Value |
|---|---|---|
| DefectFound | pageName = < application_page_name> & observation = < observation_name> (The metric is repeated for all observations recorded by defective components on the page.) | <number of times the observation was made on defective components> |

(4) Response Generation

In certain embodiments, the final stage of the defect detection service (for example, classifier thereof, e.g., Zed Ordering classifier) is to build the response, e.g., from the metrics.

---

EXAMPLE RESPONSE FOR A DETECTED DEFECT:

```
{
    "defectsFound": "DEFECTS_FOUND",
    "defectRegions": [
        {
            "top": 0,
            "left": 0.4802,
            "height": 0.5870,
            "width": 0.5198
        }
    ],
    "metadata": {
        "approxNumberOfCharacters": 407
    }
}
```

---

In certain embodiments, the status field in the response is set to DEFECTS_FOUND if the page contains any components with a non-suppressed defect (otherwise NO_DE-FECTS_FOUND is specified). In certain embodiments, the defect regions ("defectRegions") list the location and dimensions of each non-suppressed defect, e.g., after translating each measurement to a percentage of the overall page height/width. In certain embodiments, the approximate number of character ("approxNumberOfCharacters") is populated with the number of skipped components (e.g., with reason=UNDERSIZED).

In certain embodiments, the response includes a graphical user interface that illustrates the detected defect(s) for the captured application image.

FIG. 11 is an example 1100 of a graphical user interface that illustrates detected defects for the captured application image in FIG. 8 according to some embodiments. Here, an indication (for example, shown as a red cross-through box, e.g., with optional green line added here to add a reference number for this patent application but not necessarily included when actually displayed) is added for each (e.g., non-suppressed) defect, for example, a red (or other color) X (or cross-through box or other defect indication) for defect 1102 for background (e.g., hero) image and the depicted components (e.g., thumbnails for those corresponding media titles) bleeding together, a red (or other color) X (or cross-through box or other defect indication) for defect 1104 for label of "Customers who watched this item also watched" being overlaid onto the "Languages & more" button, and a red (or other color) X (or cross-through box or other defect indication) for defect 1106 for those two components being overlaid onto an orange text box.

In certain embodiments, the example 1100 is the output 218 in FIG. 2, e.g., the example 1100 is displayed in graphical user interface 220 to illustrates the defect(s), e.g., as shown in FIG. 11 or as can be shown as the image in FIG. 8 with the red boxes from FIG. 11 overlaid on the components as shown in FIG. 8.

Figure 12:
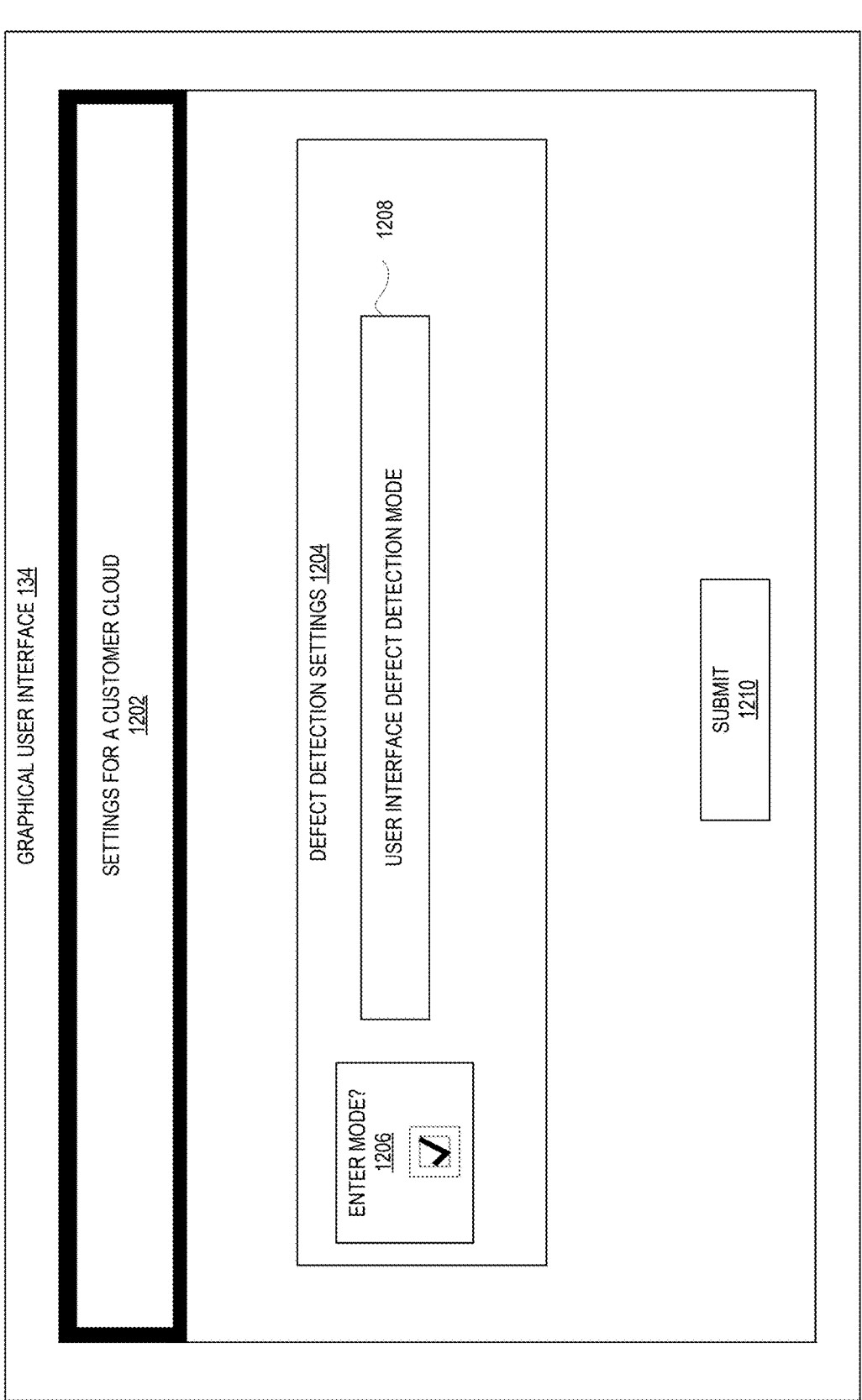
FIG. 12 is a diagram illustrating a graphical user interface for setting a customer cloud to a user interface defect detection mode according to some embodiments.

FIG. 12 is a diagram illustrating a graphical user interface 134 for setting a customer cloud (e.g., a defect detection service thereof) to a user interface defect detection mode according to some embodiments. Depicted graphical user interface 134 includes a field 1202 that is customizable with text to indicate that these are settings for a customer cloud, a field 1204 that is customizable with text to indicate that these are defect detection settings, an interface element 1206 that, when selected, will cause a defect detection service of a cloud provider network to enter into a user interface defect detection mode, and a field 1208 that is customizable with text to indicate that selecting the interface element 1206 is to cause user interface defect detection. A user (e.g., cloud customer) may click the submit interface element 1210 to (e.g., cause a command to be sent that causes) enter defect detection service of a cloud provider network to enter into a user interface defect detection mode. An interface element, may include, but is not limited to, a thumbs up (or down), checkbox, button, dropdown menu, etc.

FIG. 13 is a flow diagram illustrating operations 1300 of a method of defect detection on a media player application by a cloud provider network according to some embodiments. Some or all of the operations 1300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium is non-transitory. In some embodiments, one or more (or all) of the operations 1300 are performed by cloud provider network (e.g., system/service) (or a component thereof) of the other figures.

The operations 1300 include, at block 1302, receiving a request at a cloud provider network to perform a defect detection on a media player application. The operations 1300 further include, at block 1304, capturing an image of a user interaction with a user interface of the media player application. The operations 1300 further include, at block 1306, determining, by the cloud provider network, one or more components of the user interface from the image. The operations 1300 further include, at block 1308, detecting, by the cloud provider network, a defect in the user interface from the one or more components without a comparison to a reference image. The operations 1300 further include, at block 1310, generating, by the cloud provider network, an output based at least in part on the defect.

Exemplary environments, systems, etc. that the above may be used in are detailed below.

At least some embodiments of the disclosed technologies can be described in view of the following examples:

Example 1. A computer-implemented method comprising:

receiving a request at a cloud provider network to perform a defect detection on a media player application;

capturing an image of a user interaction with a user interface of the media player application;

determining, by the cloud provider network, one or more components of the user interface from pixels of the image;

detecting, by the cloud provider network, a defect in the user interface from the one or more components without creating a reference image; and generating, by the cloud provider network, an output based at least in part on the defect.

Example 2. The computer-implemented method of example 1, wherein the detecting comprises applying a set of one or more rules to the one or more components from the image of the user interface to detect the defect.

Example 3. The computer-implemented method of example 1, wherein the detecting comprises generating an inference of the defect by a machine learning model for an input of the one or more components from the image of the user interface.

Example 4. A computer-implemented method comprising:

receiving a request at a cloud provider network to perform a defect detection on a media player application;

capturing an image of a user interaction with a user interface of the media player application;

determining, by the cloud provider network, one or more components of the user interface from the image;

detecting, by the cloud provider network, a defect in the user interface from the one or more components without a comparison to a reference image; and generating, by the cloud provider network, an output based at least in part on the defect.

Example 5. The computer-implemented method of example 4, wherein the detecting comprises applying a set of one or more rules to the one or more components from the image of the user interface to detect the defect.

Example 6. The computer-implemented method of example 5, wherein the set of one or more rules includes a rule that each component of the one or more components is rectangular with clean edges.

Example 7. The computer-implemented method of example 5, wherein the set of one or more rules includes a rule that each component of the one or more components is less than a threshold percentage of a width and a height of the image.

Example 8. The computer-implemented method of example 4, wherein the detecting comprises generating an inference of the defect by a machine learning model for an input of the one or more components from the image of the user interface.

Example 9. The computer-implemented method of example 4, further comprising generating the user interaction by a human interaction emulation service of the cloud provider network interacting with the user interface of the media player application.

Example 10. The computer-implemented method of example 4, further comprising identifying a background of the image of the user interaction; and removing the background from the image of the user interaction to generate a foreground version of the image, wherein the determining, by the cloud provider network, the one or more components of the user interface is from the foreground version of the image.

Example 11. The computer-implemented method of example 10, wherein the background is a predefined image.

Example 12. The computer-implemented method of example 10, wherein the determining the one or more components of the user interface from the foreground version of the image comprises performing a connected component labelling on the foreground version of the image.

Example 13. The computer-implemented method of example 4, wherein the output comprises blocking of deployment of the media player application by the cloud provider network.

Example 14. The computer-implemented method of example 4, wherein the output comprises displaying a graphical user interface that illustrates the defect on the image.

Example 15. A system comprising:

a content data store to store an image of a user interaction with a user interface of a media player application; and one or more electronic devices to implement a computing service, the computing service including instructions that upon execution cause the computing service to perform operations comprising:

accessing the image of the user interaction with the user interface of the media player application, determining one or more components of the user interface from the image, detecting a defect in the user interface from the one or more components without a comparison to a reference image, and generating an output based at least in part on the defect.

Example 16. The system of example 15, wherein the instructions upon execution cause the computing service to perform operations wherein the detecting comprises applying a set of one or more rules to the one or more components from the image of the user interface to detect the defect.

Example 17. The system of example 15, wherein the instructions upon execution cause the computing service to perform operations wherein the detecting comprises generating an inference of the defect by a machine learning model for an input of the one or more components from the image of the user interface.

Example 18. The system of example 15, wherein the instructions upon execution cause the computing service to perform operations further comprising generating the user interaction by a human interaction emulation service of the computing service interacting with the user interface of the media player application.

Example 19. The system of example 15, wherein the instructions upon execution cause the computing service to perform operations wherein the output comprises blocking of deployment of the media player application to a viewer device.

Example 20. The system of example 15, wherein the instructions upon execution cause the computing service to perform operations wherein the output comprises displaying a graphical user interface that illustrates the defect on the image.

Figure 14:
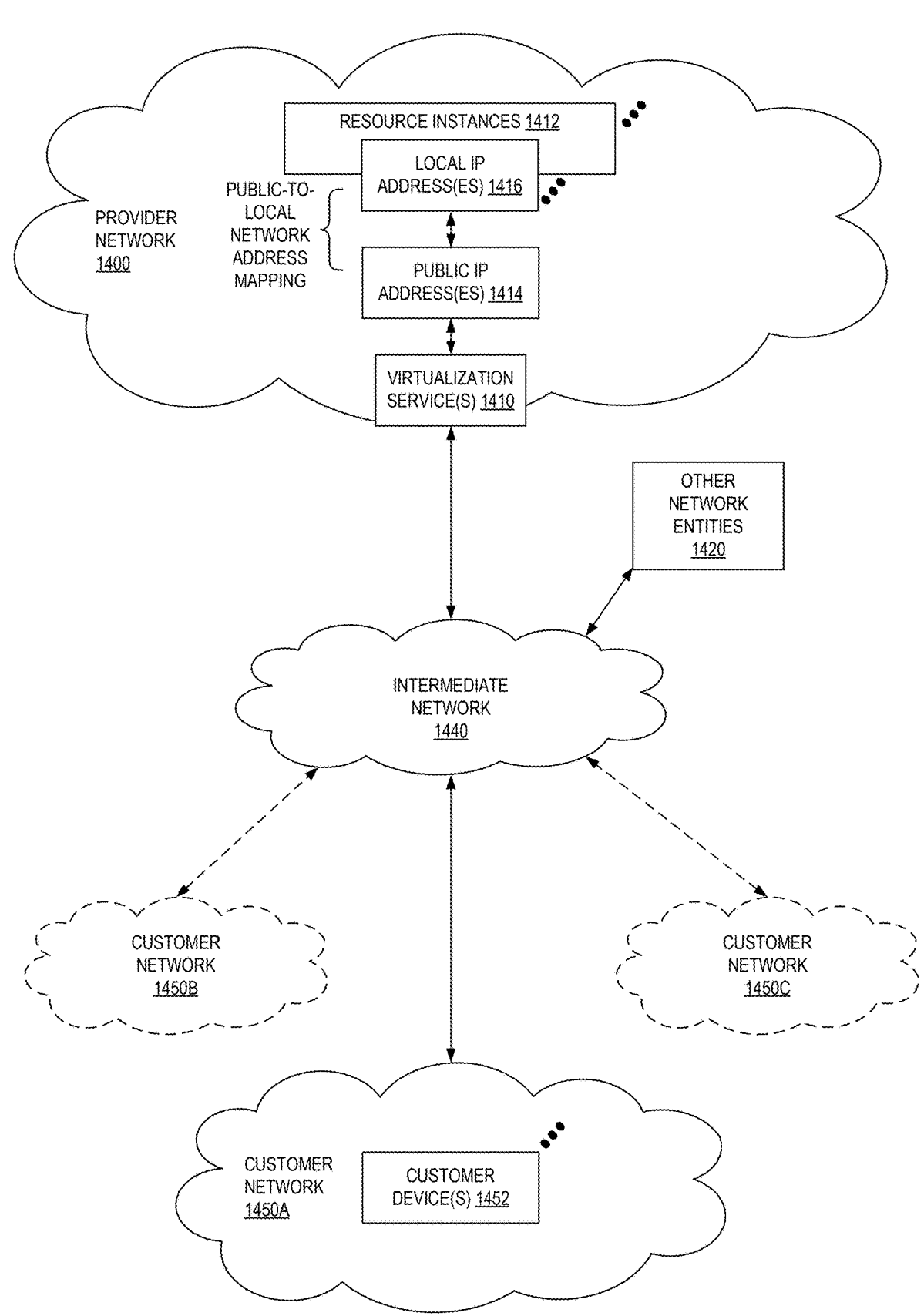
FIG. 14 illustrates an example provider network environment according to some embodiments.

FIG. 14 illustrates an example provider network (or "service provider system") environment according to some embodiments. A provider network 1400 may provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 may be associated with the resource instances 1412; the local IP addresses are the internal network addresses of the resource instances 1412 on the provider network 1400. In some embodiments, the provider network 1400 may also provide public IP addresses 1414 and/or public IP address ranges (e.g., Internet Protocol version 4 (IPv4) or Internet Protocol version 6 (IPv6) addresses) that customers may obtain from the provider 1400.

Conventionally, the provider network 1400, via the virtualization services 1410, may allow a customer of the service provider (e.g., a customer that operates one or more client networks 1450A-1450C including one or more customer device(s) 1452) to dynamically associate at least some public IP addresses 1414 assigned or allocated to the customer with particular resource instances 1412 assigned to the customer. The provider network 1400 may also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of customer network(s) 1450A-1450C may, for example, implement customer-specific applications and present the customer's applications on an intermediate network 1440, such as the Internet. Other network entities 1420 on the intermediate network 1440 may then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 may be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1400; a customer may then assign their allocated public IP addresses to particular resource instances allocated to the customer. These public IP addresses may be referred to as customer public IP addresses, or simply customer IP addresses. Instead of being assigned by the provider network 1400 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
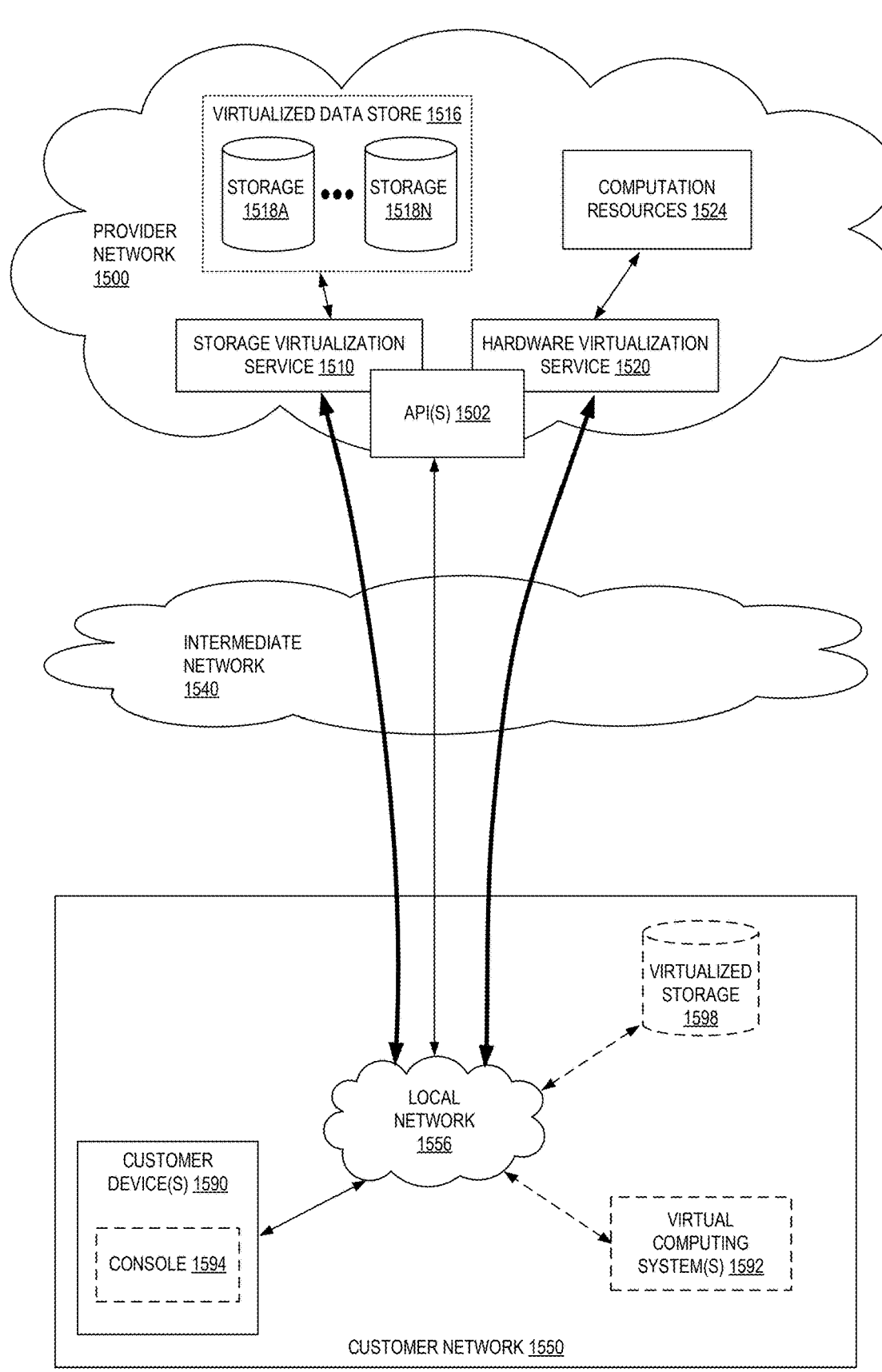
FIG. 15 is a block diagram of an example provider network that provides a storage service and a hardware virtualization service to customers according to some embodiments.

FIG. 15 is a block diagram of an example provider network that provides a storage service and a hardware virtualization service to customers, according to some embodiments. Hardware virtualization service 1520 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some embodiments, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage service 1510, for example via one or more APIs 1502, to access data from and store data to storage resources 1518A-1518N of a virtual data store 1516 (e.g., a folder or "bucket", a virtualized volume, a database, etc.) provided by the provider network 1500. In some embodiments, a virtualized data store gateway (not shown) may be provided at the customer network 1550 that may locally cache at least some data, for example frequently-accessed or critical data, and that may communicate with storage service 1510 via one or more communications channels to upload new or modified data from a local cache so that the primary store of data (virtualized data store 1516) is maintained. In some embodiments, a user, via a virtual computing system 1592 and/or on another customer device 1590, may mount and access virtual data store 1516 volumes via storage service 1510 acting as a storage virtualization service, and these volumes may appear to the user as local (virtualized) storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

Illustrative System

Figure 16:
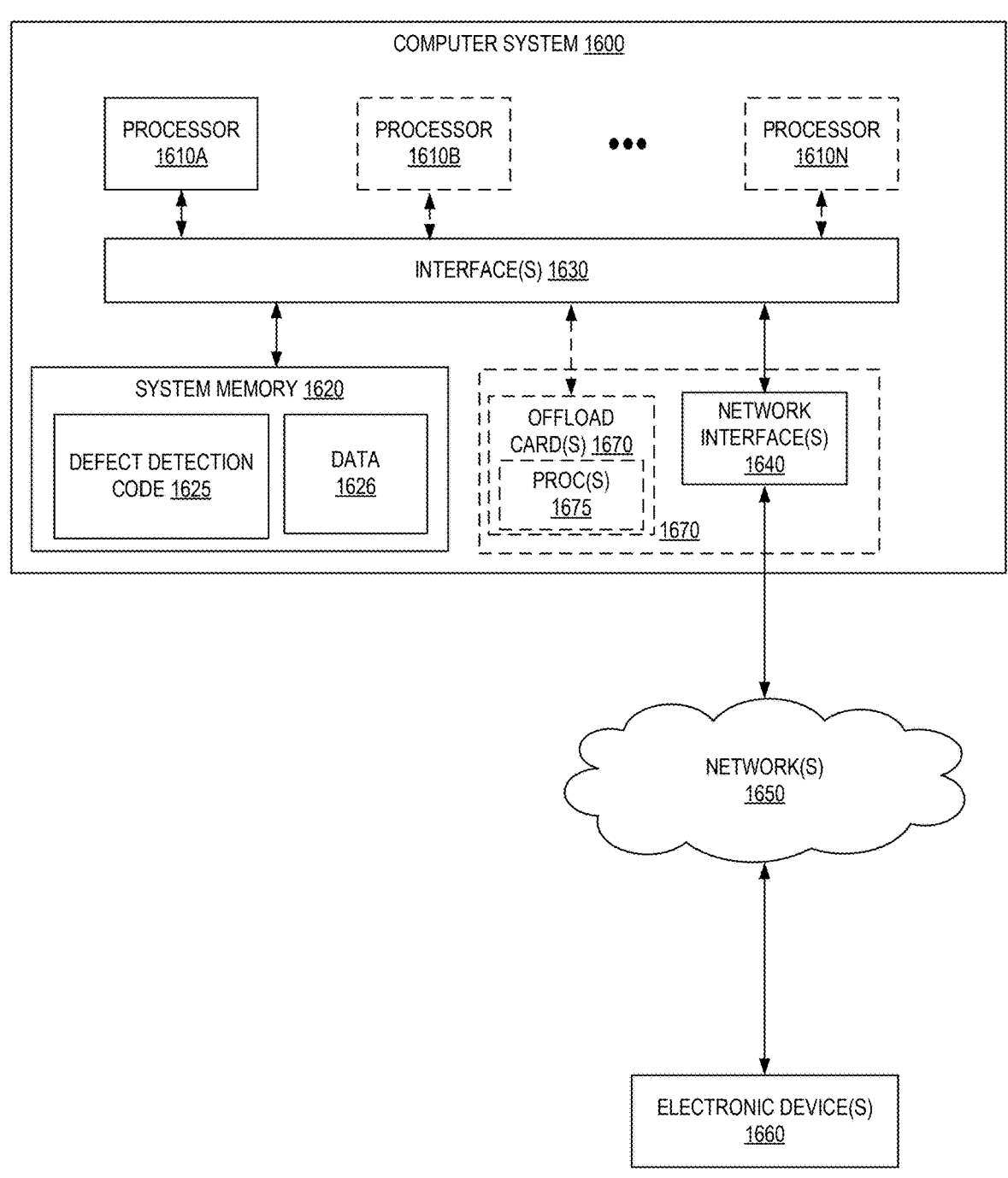
FIG. 16 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1600 illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various embodiments a computer system 1600 may include one computing device or any number of computing devices configured to work together as a single computer system 1600.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various embodiments, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1620 as defect detection code 1625 (e.g., executable to implement, in whole or in part, the defect detection service 108A) and data 1626.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing, or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1600 includes one or more offload cards 1670 (including one or more processors 1675, and possibly including the one or more network interfaces 1640) that are connected using an I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1600 may act as a host electronic device (e.g., operating as part of a hardware virtualization service) that hosts compute instances, and the one or more offload cards 1670 execute a virtualization manager that can manage compute instances that execute on the host electronic device. As an example, in some embodiments the offload card(s) 1670 can perform compute instance management operations such as pausing and/or un-pausing compute instances, launching and/or terminating compute instances, performing memory transfer/copying operations, etc. These management operations may, in some embodiments, be performed by the offload card(s) 1670 in coordination with a hypervisor (e.g., upon a request from a hypervisor) that is executed by the other processors 1610A-1610N of the computer system 1600. However, in some embodiments the virtualization manager implemented by the offload card(s) 1670 can accommodate requests from other entities (e.g., from compute instances themselves), and may not coordinate with (or service) any separate hypervisor.

In some embodiments, system memory 1620 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Figure 17:
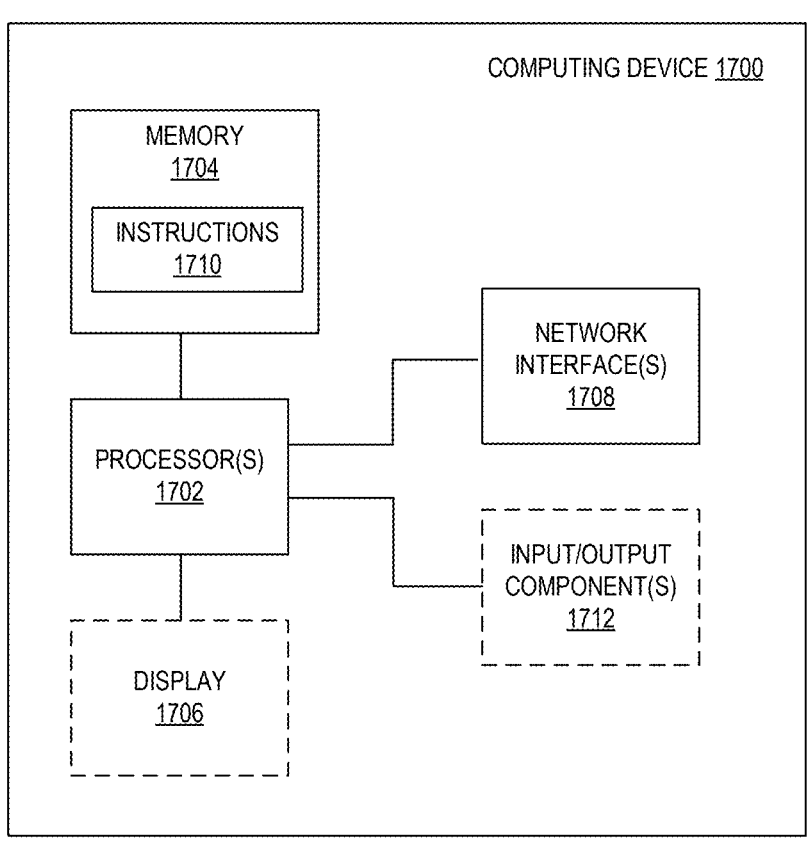
FIG. 17 illustrates a logical arrangement of a set of general components of an exemplary computing device that can be utilized in accordance with various embodiments.

FIG. 17 illustrates a logical arrangement of a set of general components of an example computing device 1700. Generally, a computing device 1700 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1702 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1704) to store code (for example, instructions 1710, e.g., which implement a content delivery service as disclosed herein), and a set of one or more wired or wireless network interfaces 1708 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1704) of a given electronic device typically stores code (e.g., instructions 1710) for execution on the set of one or more processors 1702 of that electronic device. One or more parts of various embodiments may be implemented using different combinations of software, firmware, and/or hardware.

A computing device 1700 can include some type of display element 1706, such as a touch screen or liquid crystal display (LCD), although many devices such as portable media players might convey information via other means, such as through audio speakers, and other types of devices such as server end stations may not have a display element 1706 at all. As discussed, some computing devices used in some embodiments include at least one input and/or output component(s) 1712 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 18:
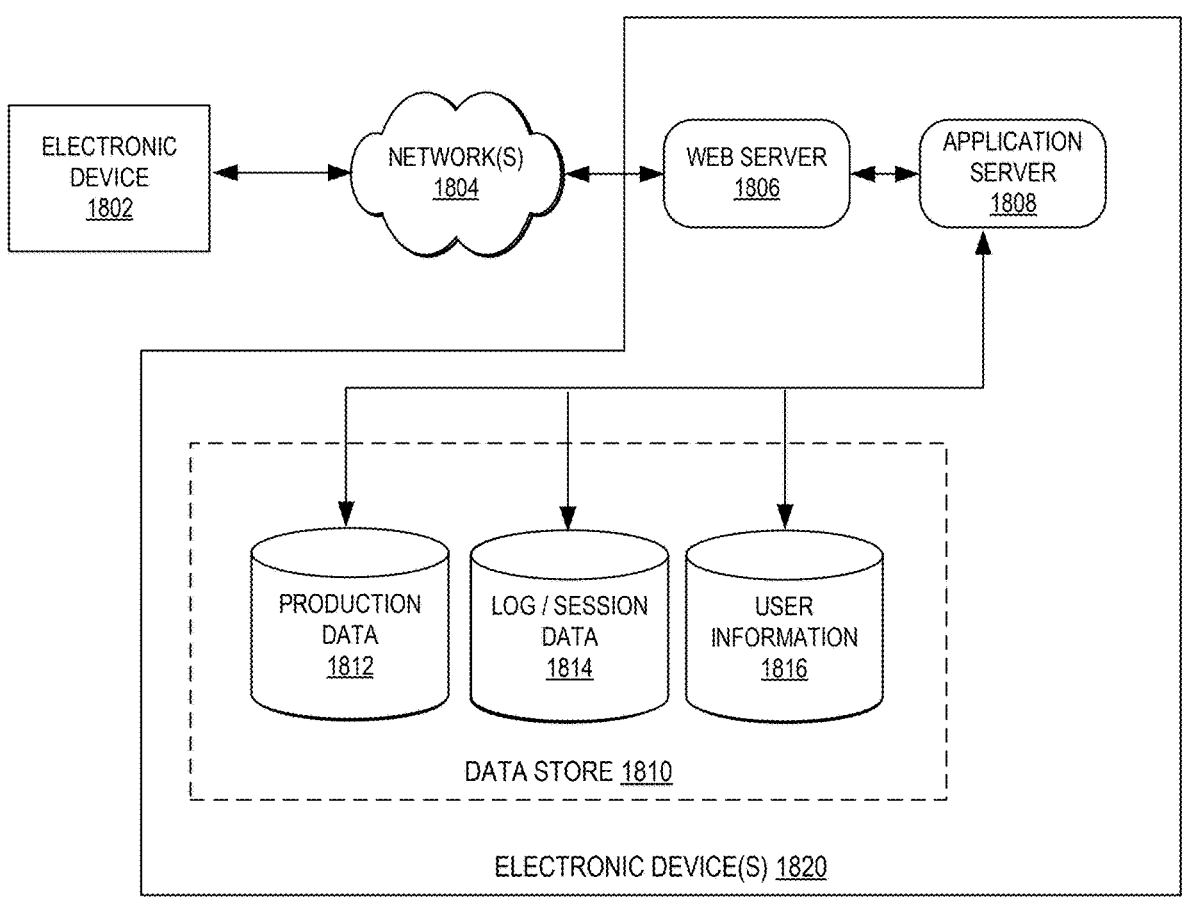
FIG. 18 illustrates an example of an environment for implementing aspects in accordance with various embodiments.

As discussed, different approaches can be implemented in various environments in accordance with the described embodiments. For example, FIG. 18 illustrates an example of an environment 1800 for implementing aspects in accordance with various embodiments. For example, in some embodiments messages are HyperText Transfer Protocol (HTTP) requests that are received by a web server (e.g., web server 1806), and the users, via electronic devices, may interact with the provider network via a web portal provided via the web server 1806 and application server 1808. As will be appreciated, although a web-based environment is used for purposes of explanation, different environments may be used, as appropriate, to implement various embodiments. The system includes an electronic client device 1802, which may also be referred to as a client device and can be any appropriate device operable to send and receive requests, messages, or information over an appropriate network 1804 and convey information back to a user of the device 1802. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1804 includes the Internet, as the environment includes a web server 1806 for receiving requests and serving content in response thereto, although for other networks an alternative device serving a similar purpose could be used, as would be apparent to one of ordinary skill in the art.

The illustrative environment includes at least one application server 1808 and a data store 1810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1808 can include any appropriate hardware and software for integrating with the data store 1810 as needed to execute aspects of one or more applications for the client device 1802 and handling a majority of the data access and business logic for an application. The application server 1808 provides access control services in cooperation with the data store 1810 and is able to generate content such as text, graphics, audio, video, etc., to be transferred to the client device 1802, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1802 and the application server 1808, can be handled by the web server 1806. It should be understood that the web server 1806 and application server 1808 are not required and are merely example components, as structured code discussed herein can be executed on any appropriate device or host machine as discussed elsewhere herein.

The data store 1810 can include several separate data tables, databases, or other data storage mechanisms and media for storing data relating to a particular aspect. For example, the data store illustrated includes mechanisms for storing production data 1812 and user information 1816, which can be used to serve content for the production side. The data store 1810 also is shown to include a mechanism for storing log or session data 1814. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update, or otherwise process data in response thereto. In one example, a user might submit a search request for a certain type of item. In this case, the data store 1810 might access the user information 1816 to verify the identity of the user and can access a production data 1812 to obtain information about items of that type. The information can then be returned to the user, such as in a listing of results on a web page that the user is able to view via a browser on the user device 1802. Information for a particular item of interest can be viewed in a dedicated page or window of the browser.

The web server 1806, application server 1808, and/or data store 1810 may be implemented by one or more electronic devices 1820, which can also be referred to as electronic server devices or server end stations, and may or may not be located in different geographic locations. Each of the one or more electronic devices 1820 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the environment 1800 in FIG. 18 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1518A-1518N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request at a cloud provider network to perform a defect detection on a media player application;
capturing an image of a user interaction with a user interface of the media player application;
identifying, by the cloud provider network, a gradient background within the image;
removing, by the cloud provider network, the gradient background from the image to generate a foreground version of the image by:
determining a primary background color of the image,
replacing pixels of the gradient background in the image with pixels of the primary background color to generate a modified image, and
extracting the foreground version of the image from the modified image based on the primary background color;
determining, by the cloud provider network, one or more components of the user interface from the foreground version of the image;
detecting, by the cloud provider network, a defect in the user interface by generating an inference by a machine learning model, trained on a training image that comprises one or more defects, based on the one or more components without creating one or more features from a reference image; and
generating, by the cloud provider network, an output based at least in part on the defect.

2. The computer-implemented method of claim 1, wherein the detecting comprises applying a set of one or more rules to the one or more components from the image of the user interface to detect the defect.

3. A computer-implemented method comprising:
receiving a request at a cloud provider network to perform a defect detection on a media player application;
capturing an image of a user interaction with a user interface of the media player application;
identifying, by the cloud provider network, a gradient background within the image;
removing, by the cloud provider network, the gradient background from the image to generate a foreground version of the image by:
determining a primary background color of the image,
replacing pixels of the gradient background in the image with pixels of the primary background color to generate a modified image, and
extracting the foreground version of the image from the modified image based on the primary background color;

determining, by the cloud provider network, one or more components of the user interface from the foreground version of the image;

detecting, by the cloud provider network, a defect in the user interface by generating an inference by a machine learning model, trained on a training image that comprises one or more defects, based on the one or more components without a comparison to one or more features from a reference image; and generating, by the cloud provider network, an output based at least in part on the defect.

4. The computer-implemented method of claim 3, wherein the detecting comprises applying a set of one or more rules to the one or more components from the image of the user interface to detect the defect.

5. The computer-implemented method of claim 4, wherein the set of one or more rules includes a rule that each component of the one or more components is rectangular with clean edges.

6. The computer-implemented method of claim 4, wherein the set of one or more rules includes a rule that each component of the one or more components is less than a threshold percentage of a width and a height of the image.

7. The computer-implemented method of claim 3, wherein the determining the one or more components of the user interface from the foreground version of the image utilizes a computer vision algorithm to link adjacent foreground pixels into the one or more components of the user interface.

8. The computer-implemented method of claim 3, further comprising generating the user interaction by a human interaction emulation service of the cloud provider network interacting with the user interface of the media player application.

9. The computer-implemented method of claim 3, wherein the replacing is based on a reference gradient background image.

10. The computer-implemented method of claim 3, wherein the determining the one or more components of the user interface from the foreground version of the image generates bounding box coordinates and a number of pixels for the one or more components.

11. The computer-implemented method of claim 3, wherein the output comprises blocking of deployment of the media player application by the cloud provider network.

12. The computer-implemented method of claim 3, wherein the output comprises displaying a graphical user interface that illustrates the defect on the image.

13. A system comprising:

a hardware content data store to store an image of a user interaction with a user interface of a media player application; and one or more hardware electronic devices to implement a computing service, the computing service including instructions that upon execution cause the computing service to perform operations comprising:

accessing the image of the user interaction with the user interface of the media player application, identifying a gradient background within the image, removing the gradient background from the image to generate a foreground version of the image by:

determining a primary background color of the image, replacing pixels of the gradient background in the image with pixels of the primary background color to generate a modified image, and extracting the foreground version of the image from the modified image based on the primary background color, determining one or more components of the user interface from the foreground version of the image, detecting a defect in the user interface by generating an inference by a machine learning model, trained on a training image that comprises one or more defects, based on the one or more components without a comparison to one or more features from a reference image, and generating an output based at least in part on the defect.

14. The system of claim 13, wherein the instructions upon execution cause the computing service to perform operations wherein the detecting comprises applying a set of one or more rules to the one or more components from the image of the user interface to detect the defect.

15. The system of claim 13, wherein the instructions upon execution cause the computing service to perform operations wherein the determining the one or more components of the user interface from the foreground version of the image utilizes a computer vision algorithm to link adjacent foreground pixels into the one or more components of the user interface.

16. The system of claim 13, wherein the instructions upon execution cause the computing service to perform operations wherein the output comprises blocking of deployment of the media player application to a viewer device.

17. The system of claim 13, wherein the instructions upon execution cause the computing service to perform operations wherein the output comprises displaying a graphical user interface that illustrates the defect on the image.

* * * * *